(12) United States Patent
Ben-Noon et al.

(10) Patent No.: US 11,755,713 B2
(45) Date of Patent: *Sep. 12, 2023

(54) SYSTEM AND METHOD FOR CONTROLLING ACCESS TO AN IN-VEHICLE COMMUNICATION NETWORK

(71) Applicant: Argus Cyber Security Ltd., Tel Aviv (IL)

(72) Inventors: Ofer Ben-Noon, Tel Aviv (IL); Yaron Galula, Kadima (IL); Oron Lavi, Kfar Saba (IL)

(73) Assignee: Argus Cyber Security Ltd., Tel Aviv (IL)

( * ) Notice: Subject to any disclaimer, the term of this patent is extended or adjusted under 35 U.S.C. 154(b) by 0 days.

This patent is subject to a terminal disclaimer.

(21) Appl. No.: 17/869,792

(22) Filed: Jul. 21, 2022

(65) Prior Publication Data
US 2022/0366032 A1 Nov. 17, 2022

Related U.S. Application Data

(63) Continuation of application No. 15/272,675, filed on Sep. 22, 2016, now Pat. No. 11,397,801.
(Continued)

(51) Int. Cl.
*G06F 21/35* (2013.01)
*H04L 9/32* (2006.01)
(Continued)

(52) U.S. Cl.
CPC ............ *G06F 21/35* (2013.01); *H04L 9/3234* (2013.01); *H04L 63/10* (2013.01);
(Continued)

(58) Field of Classification Search
CPC ... H04L 63/10; H04L 63/1425; H04L 9/3234; H04L 2209/80; H04L 2209/84;
(Continued)

(56) References Cited

U.S. PATENT DOCUMENTS

| 8,848,608 B1* | 9/2014 | Addepalli | H04L 69/18 |
| | | | 370/328 |
| 2003/0009271 A1* | 1/2003 | Akiyama | H04L 67/12 |
| | | | 701/29.6 |

(Continued)

FOREIGN PATENT DOCUMENTS

EP 2892202 7/2015

OTHER PUBLICATIONS

Woo et al., "A Practical Wireless Attack on the Connected Car and Security Protocol for In-Vehicle CAN," IEEE Transactions on Intelligent Transportation Systems Year: 2015 | vol. 16, Issue: 2 | Journal Article | Publisher: IEEE.*

(Continued)

*Primary Examiner* — Roderick Tolentino
(74) *Attorney, Agent, or Firm* — PEARL COHEN ZEDEK LATZER BARATZ LLP

(57) ABSTRACT

A system or method may include an in-vehicle network including an interface port for connecting an external device to the in-vehicle network; and a security unit connected to the in-vehicle network, the security unit adapted to enable an external device to communicate with the in-vehicle network, over the interface port, based on a security token received from the external device. A system or method may, based on a token, prevent an external device from at least one of: communicating with a selected set of components on in an in-vehicle network, communicating with a selected set of network segments in the in-vehicle network and performing a selected set of operations.

18 Claims, 5 Drawing Sheets

Related U.S. Application Data

(60) Provisional application No. 62/232,474, filed on Sep. 25, 2015.

(51) Int. Cl.
*H04L 9/40* (2022.01)
*H04W 12/06* (2021.01)
*H04W 12/069* (2021.01)
*H04L 67/12* (2022.01)

(52) U.S. Cl.
CPC .......... *H04L 63/1425* (2013.01); *H04L 67/12* (2013.01); *H04W 12/068* (2021.01); *H04W 12/069* (2021.01); *G06F 2212/178* (2013.01); *G06F 2221/0711* (2013.01); *H04L 2209/84* (2013.01)

(58) Field of Classification Search
CPC . H04L 49/354; H04L 67/12; G06F 2212/178; G06F 21/34; G06F 21/62; G06F 21/35; G06F 2221/0711; G06F 21/552; G06F 2221/2137; H04W 12/50; H04W 12/77; H04W 4/48; H04W 12/068; H04W 12/069
USPC ........................................................ 726/2–10
See application file for complete search history.

(56) References Cited

U.S. PATENT DOCUMENTS

| | | | | |
|---|---|---|---|---|
| 2007/0169171 A1* | 7/2007 | Kumar | ................. | H04L 63/105 726/2 |
| 2014/0380416 A1* | 12/2014 | Adachi | ................... | H04L 63/20 726/2 |
| 2015/0020152 A1 | 1/2015 | Litichever et al. | | |
| 2015/0113638 A1 | 4/2015 | Valasek et al. | | |
| 2015/0365389 A1* | 12/2015 | Zhang | ................. | H04L 63/0884 713/171 |
| 2016/0012429 A1* | 1/2016 | Stanoszek | ............ | G06Q 20/325 705/21 |
| 2016/0014105 A1 | 1/2016 | Kim et al. | | |
| 2016/0099927 A1* | 4/2016 | Oz | ................... | H04W 12/0023 726/9 |
| 2016/0284212 A1* | 9/2016 | Tatourian | ......... | G08G 1/096725 |
| 2017/0257359 A1* | 9/2017 | Ogawa | ................ | H04L 63/0853 |

OTHER PUBLICATIONS

Lee et al., "Anti-theft Solutions for In-vehicle Electronic Devices," 2014 Eighth International Conference on Innovative Mobile and Internet Services in Ubiquitous ComputingYear: 2014 | Conference Paper | Publisher: IEEE.*

Wolf, Marko et al., "Design, implementation, and evaluation of a vehicular hardware security module", Information Security and Cryptology, Lecture Notes in Computer Science, vol. 7259, Springer Berlin Heidelberg, 2011, pp. 302-318.

Woo et al., "A Practical Wireless Attach on the Connected Car and Security Protocol for In-Vehicle CAN," IEEE Transactions on Intelligent Transportation Systems Year: 2015 | vol. 16, Issue: 2 | Journal Article | Publisher: IEEE.

European Search Report for European Application No. EP16190340 dated Nov. 24, 2016.

* cited by examiner

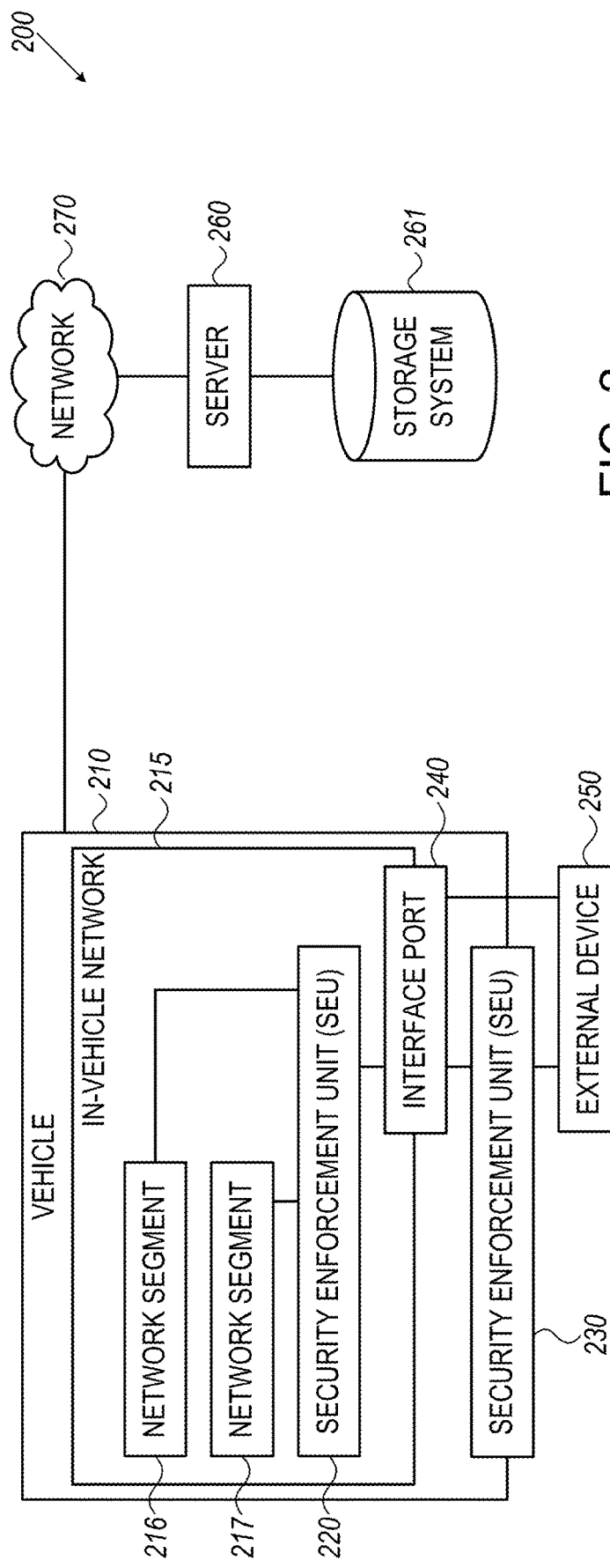

SYSTEM AND METHOD FOR CONTROLLING ACCESS TO AN IN-VEHICLE COMMUNICATION NETWORK

CROSS-REFERENCE TO RELATED APPLICATIONS

This application is a continuation of U.S. patent application Ser. No. 15/272,675, filed on Sep. 22, 2016, which claims the benefit of U.S. Provisional Patent Application No. 62/232,474, entitled "Direct Electronic Control Unit (ECU) Connections", filed on Sep. 25, 2015, the entire contents of which are incorporated herein by reference in their entireties.

FIELD OF THE INVENTION

The present invention relates generally to controlling access to an in-vehicle network. In particular, embodiments of the invention enable detecting and controlling access to an in-vehicle network via physical interface port of the network.

BACKGROUND OF THE INVENTION

Over the last half a century the automotive industry, has, initially slowly, and subsequently with great rapidity, been evolving from using mechanical control systems to control a vehicle's functions to electronic "drive by wire" control systems for controlling the functions. In mechanical vehicular control systems, a driver of a vehicle (or a mechanic or service personnel) controls components of a vehicle that control vehicle functions by operating mechanical systems that directly couple the operator to the components via mechanical linkages. In drive by wire vehicle control systems, a driver or operator of the vehicle may be coupled directly, and/or very often indirectly, to vehicle control components that control vehicle functions by electronic control systems and electronic wire and/or wireless communication channels, rather than direct mechanical linkages. An operator of a vehicle controls the control components by generating electronic signals that are input to the communication channels and the electronic control systems. A vehicle may be an automobile, car, truck, boat, etc.

In modern vehicles, an electronic control unit (ECU) connected to an in-vehicle network may receive user generated signals and/or signals generated by sensors or actuators connected to the in-vehicle network, and responsive to the signals, operates to control a vehicle component involved in performing a function. The ECU of a given control system may also receive and process signals relevant to performance of the function generated by components in other vehicle control systems. The sensors, actuators, and/or other control systems communicate with each other and the ECU of a given control system via a shared in-vehicle communication network, to cooperate in carrying out the function of the given control system. Messages sent over an in-vehicle network as described herein may include signals and/or signal values.

By way of example, a vehicle throttle by wire control system that replaces a conventional cable between an accelerator pedal and an engine throttle may include an electronic accelerator pedal, an ECU also referred to as an engine control module (ECM), and an electronic throttle valve that controls airflow and/or fuel injection into the engine and thereby controls power that the engine produces. The electronic accelerator pedal generates electronic signals responsive to positions to which a driver depresses the pedal. The ECM receives the accelerator pedal signals, and in addition electronic signals that may be generated by other sensors, actuators, and electronic control systems in the vehicle that provide information relevant to the safe and efficient control of the engine via an in-vehicle communication network. The ECM processes the driver input signals and the other relevant signals to generate electronic control signals that control the throttle. Among the other sensors actuators, and electronic control systems that may provide relevant signals to the ECM over the in-vehicle network are, air-flow sensors, throttle position sensors, fuel injection sensors, engine speed sensors, vehicle speed sensors, brake force and other traction control sensors included in a brake by wire system, and cruise control sensors. Typically, messages sent over an in-vehicle network as described herein include one or more signals or signal values. The terms message and signal as used herein may mean, or relate to, values sent by nodes on an in-vehicle network, accordingly, the terms message and signal may be used interchangeably herein.

In-vehicle communication networks of modern vehicles are typically required to support communications for a relatively large and increasing number of electronic control systems of varying degrees of criticality to the safe and efficient operation of the vehicles. A modern vehicle may for example be home to as many as seventy or more control system ECUs that communicate with each other and sensors and actuators that monitor and control vehicle functions via the in-vehicle network. The ECUs may, by way of example, be used to control in addition to engine throttle described above, power steering, transmission, antilock braking (ABS), airbag operation, cruise control, power windows, doors, and mirror adjustment.

An in-vehicle network typically supports on board diagnostic (OBD) systems and communication ports, various vehicle status warning systems, collision avoidance systems, audio and visual information and entertainment (known in the art as infotainment) systems and processing of images acquired by on-board camera systems. The in-vehicle network in general also provides access to mobile communication networks, e.g., WiFi and Bluetooth communication networks or systems, tire pressure monitor system (TPMS), vehicle to vehicle and vehicle to infrastructure communication (V2X), keyless entry system, the Internet, and global positioning systems (GPS).

Various communication protocols have been developed to configure, manage, and control communications of vehicle components that are connected to, and communicate over, an in-vehicle communication network. Popular in-vehicle network communication protocols currently available are, for example, control area network (CAN), an automotive network communications protocol known as FlexRay, diagnostics over internet protocol (DoIP), Media Oriented Systems Transport (MOST), Ethernet, and local interconnect network (LIN). The protocols may define a hardware communication bus and how the ECUs, sensors and actuators, generically referred to as nodes, connected to the communication bus, access and use the bus to transmit signals to each other.

The growing multiplicity of electronic control systems, sensors, actuators, ECUs and communication interfaces and ports, that an in-vehicle communication network supports makes the in-vehicle communication network, and the vehicle components that communicate via the communication system, increasingly vulnerable to attempts (e.g., by hackers) to damage, destroy, or interfere with an operation of, an in-vehicle network, node or system (e.g., cyberattacks as known in the art) that may dangerously compromise vehicle safety and performance. In addition, the growing complexity of electronic control systems in vehicles makes it harder than before to identify and/or detect faults or malfunctions of, or related to, components and networks included in a vehicle.

Servicing and/or repairing modern vehicles has evolved with the introduction of modern control systems. As described, modern vehicles may utilize a diagnostic port for diagnosing or inspecting components in a vehicle. For example, OBD is an automotive term referring to a systems and methods for diagnostics and reporting related to vehicles. Generally, an OBD system may include a port (for example an OBDII port as known in the art) that enables a repair professional or technician to access an in-vehicle network and communicate with components connected thereto.

Current systems and methods do not enable sufficient control of access to an in-vehicle communication network, for example, a hacker or other malicious entity (e.g., malicious code) that gains control of a diagnostics system may gain full and/or unsupervised access to an in-vehicle network when the compromised diagnostics system is connected to a vehicle, e.g., through an OBDII port as described.

SUMMARY OF THE INVENTION

An embodiment may include an in-vehicle network including an interface port for connecting an external device to the in-vehicle network; and a security unit connected to the in-vehicle network, the security unit adapted to enable an external device to communicate with the in-vehicle network, via or over the interface port, based on a security token received from the external device. An embodiment may, based on a token, prevent an external device from for example communicating with a selected set of components on in an in-vehicle network, communicating with a selected set of network segments in the in-vehicle network and performing a selected set of operations.

An embodiment may enable communication over the interface port using the same a token a predefined number of times. An embodiment may disable, based on a token, communication over the interface port based on at least one of: a predefined time interval and an event. A token may be provided to a security unit by one of: a hardware component directly connected to an interface port and an external network. An embodiment may, based on a token, prevent an external device from for example communicating with a selected set of components on the in-vehicle network, communicating with a selected set of network segments in-vehicle network and performing a selected set of operations.

An embodiment may record information related to a communication with the external device and may upload recorded information to a server. A server may, based on recorded information, generate a history log of maintenance service of the vehicle, identify unauthorized access to the in-vehicle network, identify malicious activity on the in-vehicle network and generate insights based on the recorded data.

An embodiment may synchronize a time value between a generator of a token and a security unit; share a secret between a generator of a token and the security unit; generate, based on the shared secret and based on the synchronized a time value, at least one token; and select whether to enable or disable an external device to transfer data over an interface port of the in-vehicle network based on validating a token received from the external device, wherein the validating may be based on the at least one token.

An embodiment may generate a token based on at least one attribute of a vehicle and may validate the token based on the at least one attribute. An embodiment may generate a token based on an authentication code provided by a user to at least one of: a security unit and a server.

BRIEF DESCRIPTION OF THE DRAWINGS

Non-limiting examples of embodiments of the disclosure are described below with reference to figures attached hereto that are listed following this paragraph. Identical features that appear in more than one figure are generally labeled with a same label in all the figures in which they appear. A label labeling an icon representing a given feature of an embodiment of the disclosure in a figure may be used to reference the given feature. Dimensions of features shown in the figures are chosen for convenience and clarity of presentation and are not necessarily shown to scale.

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

FIG. 2 schematically shows a system according to illustrative embodiments of the present invention;

FIG. 3 schematically shows an exemplary token according to illustrative embodiments of the present invention.

DETAILED DESCRIPTION

Figure 1A:
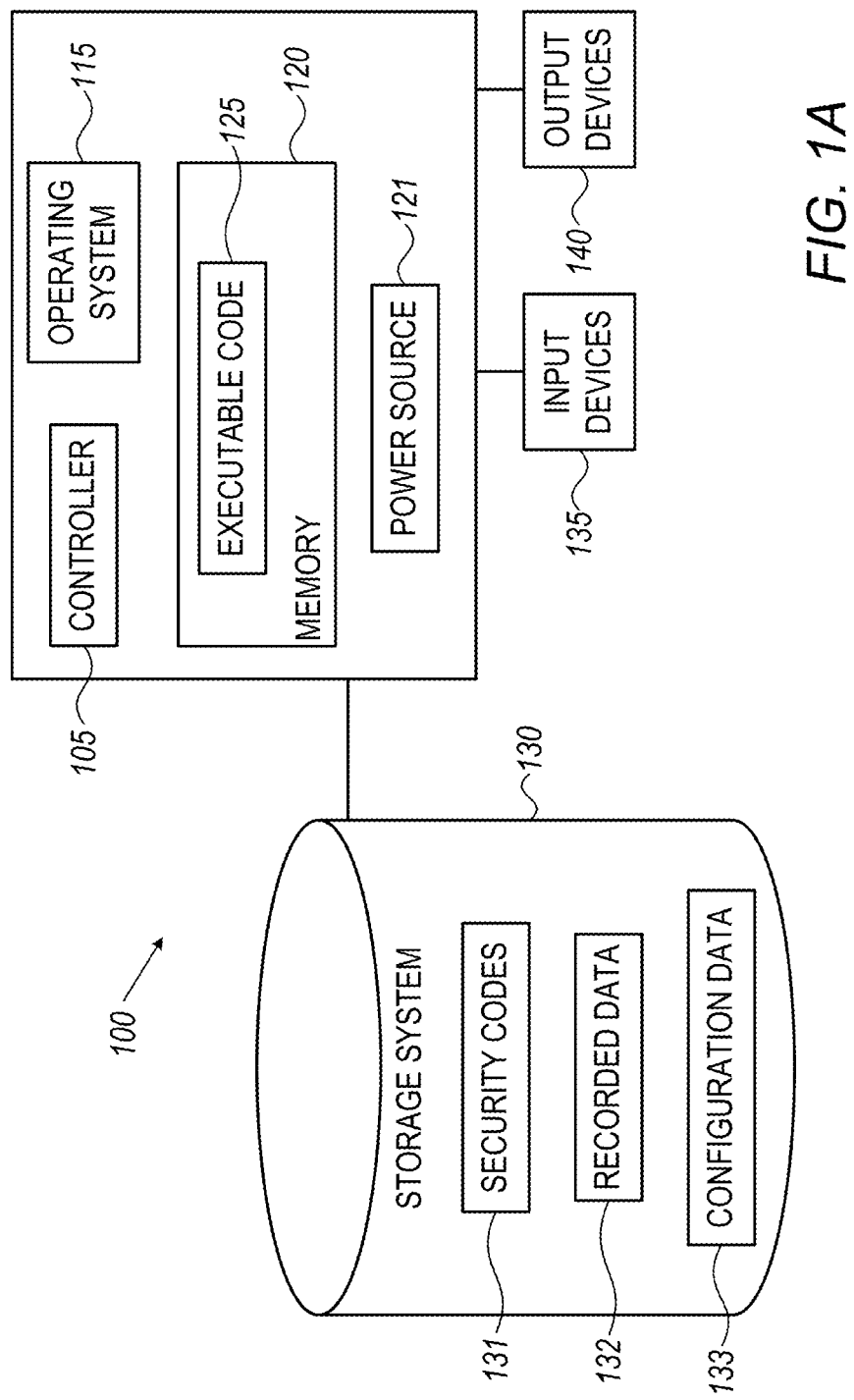
FIG. 1A shows high level block diagram of an exemplary computing device according to illustrative embodiments of the present invention.

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items. Unless explicitly stated, the method embodiments described herein are not constrained to a particular order or sequence. Additionally, some of the described method embodiments or elements thereof can occur or be performed simultaneously, at the same point in time, or concurrently.

A system and method according to some embodiments of the invention may include or use one or more computing devices in order to detect or identify security threats, detect or identify events or states that may jeopardize the security or proper function of a system and/or a network. In some embodiments and as described, one or more computing devices may be used in order to enforce security in network. For example, a system according to some embodiments may include one or more computing devices 100 (FIG. 1A) as described herein. It will be understood the enforcing security as referred to herein may include any security related operations, for example, enforcing security in a network may include detecting threats, possible threats, or suspicious activity, logging or recording threats or intrusions, alerting and so on. While threats are discussed herein, in other embodiments, non-malicious malfunctions may also be detected.

Reference is made to FIG. 1A, showing a high level block diagram of an exemplary computing device according to some embodiments of the present invention. In some embodiments, a security enforcement unit (SEU, also termed a "security unit") or security enforcement module or device adapted to monitor, control or otherwise manage communication over an interface port may be, or may include components of, computing device 100.

Computing device 100 may include a controller 105 that may be, for example, a central processing unit processor (CPU), a chip or any suitable computing or computational device, an operating system 115, a memory 120, executable code 125, a storage system 130 that may include security codes 131, recorded data 132 and configuration data 133. As further shown in FIG. 1A, computing device 100 may include a power source 121, input devices 135 and output devices 140. Controller 105 (or one or more controllers or processors, possibly across multiple units or devices) may be configured to carry out methods described herein, and/or to execute or act as the various modules, units, etc. More than one computing device 100 may be included in, and one or more computing devices 100 may act as the components of, a system according to embodiments of the invention.

Power source 121 may be any suitable power source, e.g., a battery as known in the art. Power source may 121 may provide electric power to components of computing device 100 such that computing device 100 and/or any component included in computing device may operate or function without requiring an external power source. Power source 121 may be a rechargeable unit or device, e.g., a nickel-cadmium battery (also known in the art as NiCd battery or NiCad battery) that may be charged or recharged, e.g., from or by a battery or generator in a vehicle. In another embodiment a feed from a vehicle power system may be used.

For example, the components shown in FIG. 2, e.g., SEU 220 as further described herein and other components may be, or may include components of, a computing device 100. For example, by executing executable code 125 stored in memory 120, controller 105, e.g., when included in a security enforcement unit as described, may be configured to carry out a method of enforcing security as described herein, by for example executing software or code stored in a memory. For example, included in a security enforcement unit, controller 105 may be configured to enforce security in a vehicle, e.g., by monitoring, controlling or otherwise managing communication over an interface port.

Operating system 115 may be or may include any code segment (e.g., one similar to executable code 125 described herein) designed and/or configured to perform tasks involving coordination, scheduling, arbitration, supervising, controlling or otherwise managing operation of computing device 100, for example, scheduling execution of software programs or tasks or enabling software programs or other modules or units to communicate. Operating system 115 may be a commercial operating system. It will be noted that an operating system 115 may be an optional component, e.g., in some embodiments, a system may include a computing device that does not require or include an operating system 115. For example, an SEU configured to control communication to/from and external system may be, or may include, a microcontroller, an application specific circuit (ASIC), a field programmable array (FPGA) and/or system on a chip (SOC) that may be used (e.g., as, or included in, an SEU) without an operating system. An external system as referred to herein may be any system or device that is external to a vehicle or to an in-vehicle network, for example, an external system may be a diagnostics or other system or device connected to an in-vehicle network in a manner allowing an exchange of data and/or signals (e.g., electrically connected) via an interface port such as an OBDII port as known in the art.

Memory 120 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 120 may be or may include a plurality of, possibly different memory units. Memory 120 may be a computer or processor non-transitory readable medium, or a computer non-transitory storage medium, e.g., a RAM.

Executable code 125 may be any executable code, e.g., an application, a program, a process, task or script. Executable code 125 may be executed by controller 105 possibly under control of operating system 115. For example, executable code 125 may be an application that enforces security in a vehicle as further described herein. Although, for the sake of clarity, a single item of executable code 125 is shown in FIG. 1A, a system according to some embodiments of the invention may include a plurality of executable code segments similar to executable code 125 that may be loaded into memory 120 and cause controller 105 to carry out methods described herein. For example, a first executable code 125 unit or segment may cause controller 105 to determine whether or not a message from an external system is to be communicated over an in-vehicle network, a second executable code 125 unit or segment may cause controller 105 to log or record events and so on.

Storage system 130 may be or may include, for example, a flash memory as known in the art, a memory that is internal to, or embedded in, a micro controller or chip as known in the art, a hard disk drive, a CD-Recordable (CD-R) drive, a Blu-ray disk (BD), a universal serial bus (USB) device or other suitable removable and/or fixed storage unit. Content may be stored in storage system 130 and may be loaded from storage system 130 into memory 120 where it may be processed by controller 105. In some embodiments, some of the components shown in FIG. 1A may be omitted. For example, memory 120 may be a non-volatile memory having the storage capacity of storage system 130. Accordingly, although shown as a separate component, storage system 130 may be embedded or included in memory 120. Security codes 131, recorded data 132 and configuration data 133 may be any digital information generated, stored and used as further described herein.

Input devices 135 may be or may include any suitable input devices, components or systems, e.g., a detachable keyboard or keypad, a mouse and the like. Output devices 140 may include one or more (possibly detachable) displays or monitors, speakers and/or any other suitable output devices. Any applicable input/output (I/O) devices may be connected to computing device 100 as shown by blocks 135 and 140. For example, a wired or wireless network interface card (NIC), a universal serial bus (USB) device or external hard drive may be included in input devices 135 and/or output devices 140. It will be recognized that any suitable number of input devices 135 and output device 140 may be operatively connected to computing device 100 as shown by blocks 135 and 140. For example, input devices 135 and output devices 140 may be used by a technician or engineer in order to connect to an SEU (that may be or may include computing device 100), download data from an SEU, read, or be presented with, data of the SEU, configure the SEU, update software and the like. Input devices or components 135 and 140 may be adapted to interface or communicate, with control or other units in a vehicle, e.g., input devices or components 135 and 140 may include ports that enable computing device 100 to communicate with an engine control unit, a suspension control unit, a traction control and the like.

A system according to some embodiments of the invention may include components such as, but not limited to, a plurality of central processing units (CPU) or any other suitable multi-purpose or specific processors or controllers (e.g., controllers similar to controller 105), a plurality of input units, a plurality of output units, a plurality of memory units, and a plurality of storage units. A system may additionally include other suitable hardware components and/or software components. In some embodiments, a system may include or may be, for example, a plurality of components that include a respective plurality of central processing units, e.g., a plurality of SEUs as described, a plurality of SEUs embedded in an on board, or in-vehicle, system or network, a plurality of chips, FPGAs or SOCs, a plurality of computer or network devices, or any other suitable computing device. For example, a system as described herein may include one or more devices such as computing device 100.

An embodiment may include or use one or more computing devices in order to detect or identify security threats, detect or identify events or states that may jeopardize the security, or proper function, of a vehicle and/or an in-vehicle network and nodes attached thereto. In some embodiments and as described, one or more computing devices (e.g., computing devices similar to computing device 100) may be used or deployed in order to enforce security or correct functioning in an on board, or in-vehicle, network. It will be understood that enforcing security as referred to herein may include enforcing any security related measures or aspects, e.g., enforcing security in an in-vehicle network may include identifying threats, logging or recording events that may be related to threats or malicious activity, alerting, blocking messages, disabling or enabling components in a network and so on.

The terms "message" and "messages" as referred to and used herein may relate to any data unit communicated over a network. For example, a message may be an individual, or single data package, signal or frame as known in the art or a message may be a group or set of data units, packages or frames. Generally, signals as referred to herein may be data sent by a control or another unit. Signal values, as referred to herein, may be values sent by a control or other unit. For example, a unit or component that monitors and/or controls oil pressure in an engine may send signals that may be messages that include values representing engine oil pressure. A message as referred to herein may be one data unit or a group of data units that are sent to, or from, an external system and/or a specific node on a network, a message may be one data unit or a group of data units, packages or frames with a common identifier, or identity (both abbreviated "ID"), similar or same payload, sent or used for a common purpose and the like. When used herein, a message may refer to the general description or type for a group of messages, each with an individual specific instantiation of that message. E.g. a message having message ID XYZ may be used to refer to a type of message having that specific ID, and any individual message within that type.

The terms "session" and "sessions" as referred to and used herein may relate to any communication or exchange of one or more messages over a network. For example and as known in the art, a session may be, or may include exchanging a number of messages between two or more computing devices. For example, a session may include an establishment phase or stage in which computing devices authenticate or validate one another, an exchange of messages, packets or other data units and a termination phase in which a session is closed or terminated. As used herein, the terms session and messages may, where applicable, refer to same thing, e.g., messages as described herein may be, or may be part of, a session and a session may be, or may include, communicating any number of messages, packets or other data units.

Figure 1B:
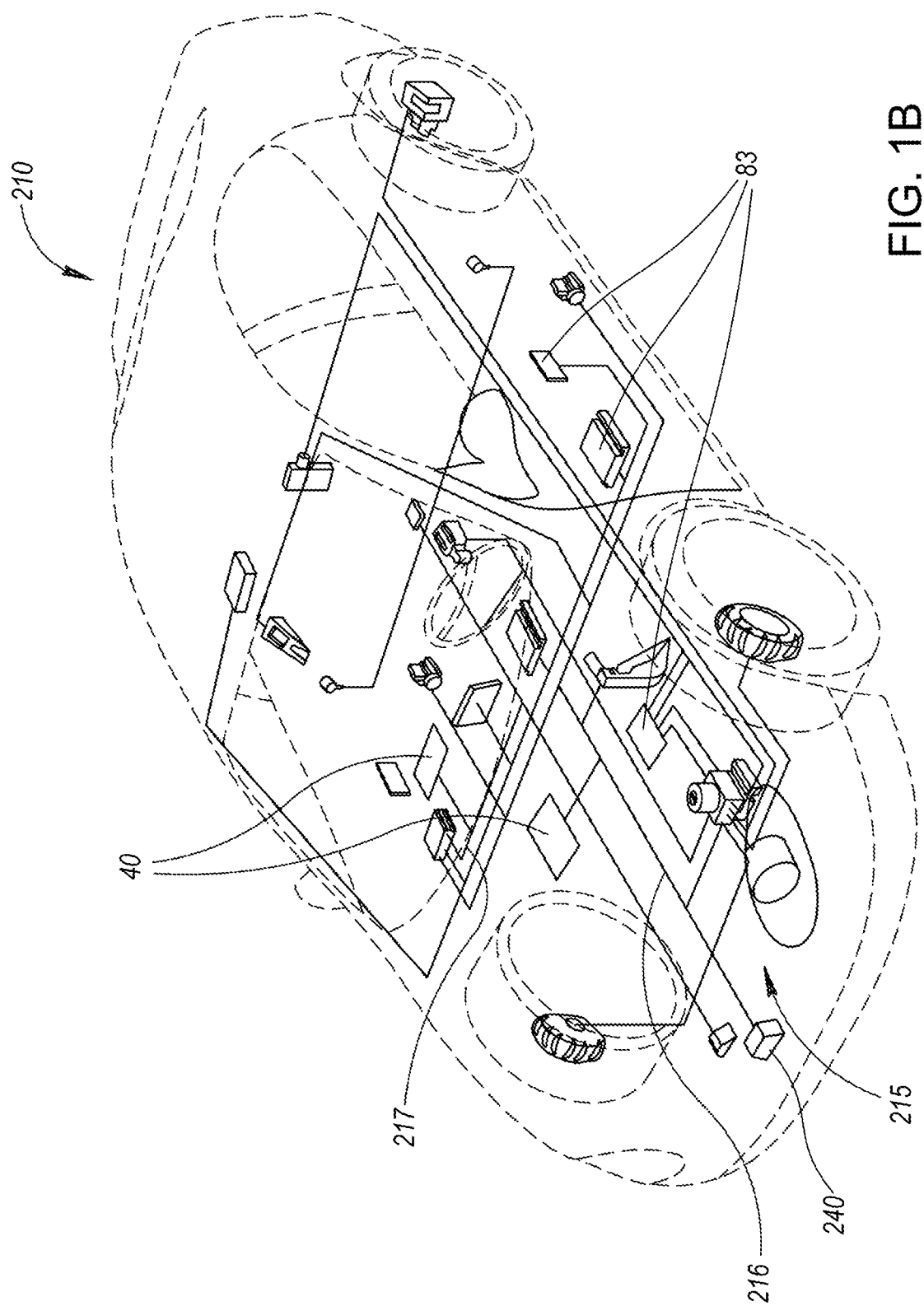
FIG. 1B schematically shows a vehicle and components of a system according to illustrative embodiments of the present invention.

Reference is made to FIG. 1B which schematically shows a vehicle 210 that includes an in-vehicle network 215. As shown, in-vehicle network 215 may include a number of segments or portions, e.g., a first segment 216 and a second segment 217. As further shown, a plurality of SEUs 40 may be connected to in-vehicle network 215. As further shown, a plurality of ECUs 83 may be connected to in-vehicle network 215. ECUs 83 are further described herein, e.g., with reference to FIG. 1C. As further shown, in-vehicle network 215 may include, or may be accessible by or via, an interface port 240.

Figure 1C:
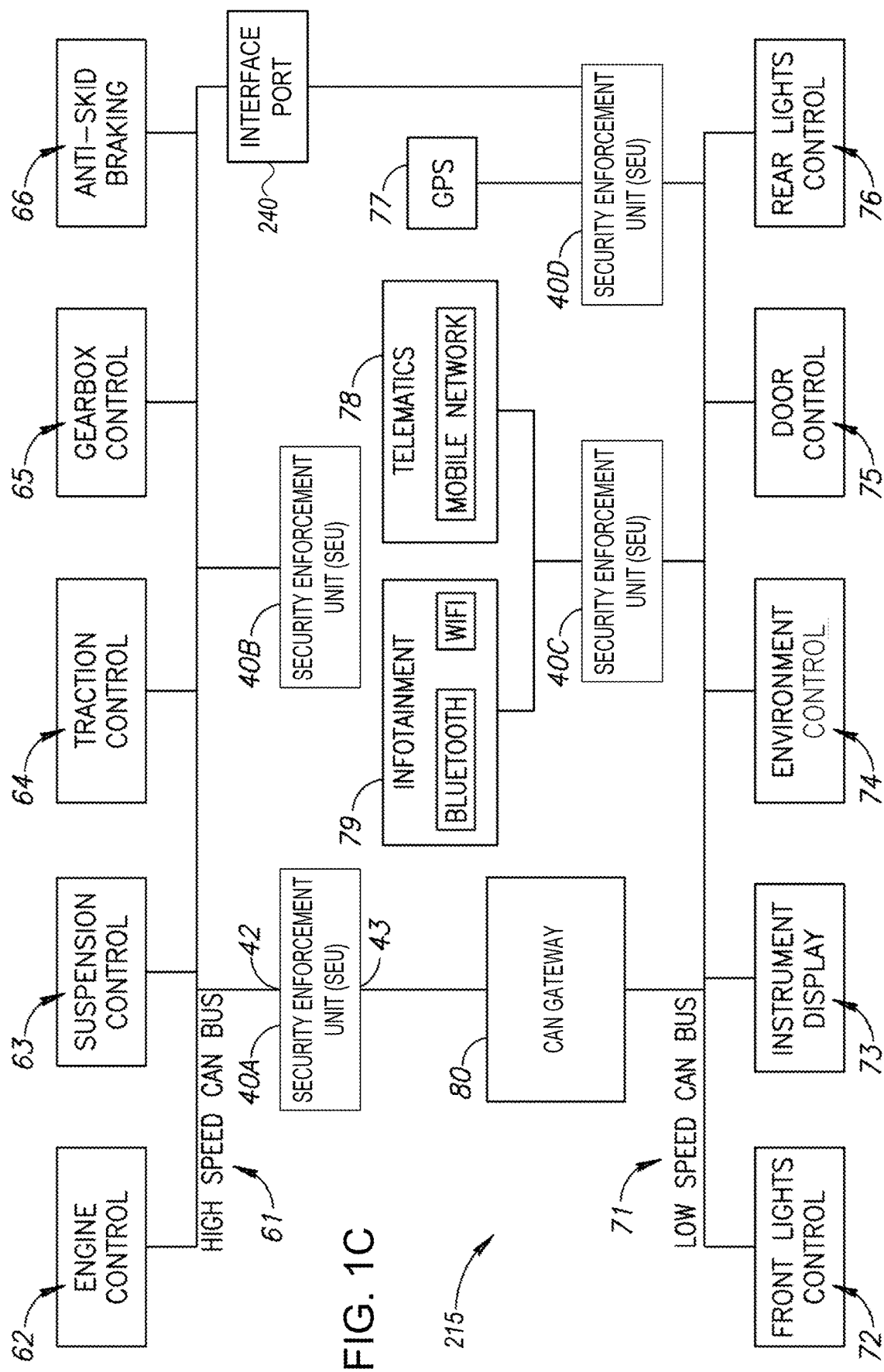
FIG. 1C shows a schematic block diagram of components of a system according to illustrative embodiments of the present invention.

Reference is made to FIG. 1C that shows a schematic block diagram of components of a system according to illustrative embodiments of the present invention. As shown, an in-vehicle communication network 215 may include two portions or segments (e.g., high speed CAN bus 61 and low speed CAN bus 71) that may be protected by a set of SEUs 40A, 40B, 40C and 40D that may protect the network and specific control systems included in vehicle 210 as further described herein. As shown, an in-vehicle network may include a set of ECUs, e.g., an engine control 62, suspension control 63, traction control 64, gearbox control 65, and braking control (anti-skid braking) control 66 connected to a first segment of in-vehicle network 212 and a front light control unit 72, an instrument display control unit 73, an environment control unit 74, a door control unit 75 and a rear lights control unit 76 connected to a second segment. Other ECUs such as a telematics control unit 78, a GPS unit 77 and an infotainment unit 79 may be connected to in-vehicle network 215 as shown. A gateway (or CAN gateway) 80 may control flow of data or messages between network segments, for example, CAN gateway 80 may control the flow of messages between high speed CAN bus 61 and low speed CAN bus 71. As shown, an interface port 240 may be connected to an in-vehicle network, e.g., directly and/or via an SEU (e.g., via SEU 40D as shown). Reference is made to FIG. 2 which schematically shows a system 200 according to illustrative embodiments of the present invention. As shown, a system 200 may include a server 260 that may be operatively connected to a storage system 261. As further shown, a system 200 may include a vehicle 210 that may include an in-vehicle network 215. In-vehicle network 215 may include an SEU 220 and may further include an interface port 240. For example, interface port may be an OBDII port as known in the art. In-vehicle network 215 may include a plurality of network portions or network segments, for example and as shown, in-vehicle network 215 may include network segment 216 and network segment 217. As shown, a system 200 may include an SEU 230 that may be fitted or installed between interface port 240 and an external device 250. SEU 230 may be connected (e.g., electrically connected, and/or connected such that data or signals may be exchanged) to network 215. For example, a socket and a plug as known in the art may be used in order to connect SEU 230 to in-vehicle network 215 or to interface port 240 and/or in order to connect external device 250 to SEU 230. A network 270 included or connected to a system may enable SEU 220 and SEU 230 to communicate with server 260.

In vehicle network 215 may include hardware communication buses, e.g., CAN hardware buses as known in the art or other types of hardware buses.

In vehicle network 215 may include, for example, a high-speed CAN bus and a medium-speed CAN bus to which various components of vehicle 210 may be connected as nodes. The term "node" (or "network node") as used and referred to herein may relate, or refer to, any component connected to an in-vehicle network, e.g., a node as referred to herein may be any unit, device or system connected to an in-vehicle network and adapted to receive and/or transmit data or messages over or via the in-vehicle network.

In-vehicle network 215 may include various components. For example, in-vehicle network 215 may include a non-critical network segment or portion (e.g., network segment 216) that includes a communication bus or other communication platform (e.g., a CAN bus) and units, ECUs or other components such as an infotainment system, a global positioning system (GPS) unit, a Bluetooth and/or Wifi communication interfaces and/or a telematics system that provides a communication interface to mobile phone networks.

In-vehicle network 215 may include a critical network segment (e.g., network segment 217) that includes a communication bus or other communication platform (e.g., a high speed CAN bus) and units, ECUs or other components such as sensors and ECUs of various control systems that may require relatively high-speed transmission of data between the nodes to operate properly. For example, units, ECUs or components connected to, or included in, a critical network segment may be an engine control unit, a suspension control unit, a traction control unit, a gearbox control and a braking control (anti-skid braking) control unit. A gateway or an SEU may connect (e.g., electrically, and/or in a way allowing an exchange of data or signals) segments in in-vehicle network 215. For example, a gateway or SEU 220 (that may act as a gateway) may selectively, e.g., based on a security token, code or other object, transmit or block messages to/from a non-critical segment (e.g., to/from network segment 216) of in-vehicle network 215 from/to a critical segment (e.g., from/to network segment 217) of in-vehicle network 215. The terms "security token", "security code" and "personal identification number" (PIN) may as referred to herein may mean the same thing and may be used interchangeably herein. For the sake of clarity and simplicity, security token may be referred to herein as token and a security code may be referred to as code. Generally, controlling network traffic based on a token, e.g., blocking messages as described herein, may include selecting to block a message if the token includes a first value and selecting to forward, send or otherwise allow or enable the message to be communicated if the token includes a second, different value.

Interface port 240 may be any port, component, device or system adapted to enable an external device 250 to access in-vehicle network 215, e.g., interact with ECUs, components or units connected in a manner allowing an exchange of data and/or signals (e.g., electrically connected) to in-vehicle network 215. Interface port 240 may electrically or otherwise connect to external device 250 so that external device 250 may connect with network 215 in a manner allowing an exchange of data and/or signals to in-vehicle network 215. For example, interface port 240 may be or may include components of an OBDII port as known in the art. SEUs 220 and 230 may be or may include components of computing device 100, e.g., SEUs 220 and 230 may include a controller 105, memory 120 and executable code 125. External device 250 may be a diagnostics tool, or another device. For example, external device 250 may be a system used, e.g., in a garage or in a vehicle service location, for inspecting, diagnosing and/or servicing vehicles as known in the art. Server 260 may be a server computer as known in the art. Storage system 261 may be any suitable storage system, e.g., a disk array or network storage system as known in the art.

Data communicated over or via interface port 240 and/or over in vehicle network 215 may be in the form of CAN messages. a CAN message in one example includes an 11 bit, or 29 bit extended, arbitration ID that may be used to identify the CAN message, a CAN message data field including a plurality of data bytes referred to as signals, and a cyclic redundancy check (CRC) code used for verifying an integrity of a message as known in the art. Other formats for a CAN message may be used. A CAN message arbitration ID may hereinafter be referred to as a CAN message ID or simply message ID. Although CAN messages and signals are mainly referred to herein, it will be understood that any types of messages and signals may be applicable and that the scope of the invention is not limited by the type or messages, signals, formats or protocols used. For example, in some embodiments, an in-vehicle network, messages and/or signals may be according to, or as defined by, the Autostar standard known in the art, e.g., signals as referred to herein may be protocol data units (PDUs) as defined by the Autostar standard.

SEU 220 and SEU 230 may be, or may include components of, computing device 100. For example, SEU 220 may be a node on in-vehicle network 215 and may be adapted to receive and/or transmit messages over or via in-vehicle network 215 as well as block messages from portions or segments of in-vehicle network 215 (e.g., when operating in a capacity of a gateway that connects network segments 216 and 217 as described). SEU 230 may be an external unit or device that can be attached (either permanently or temporarily) to interface port 240, e.g., in some embodiments external device 250 may be connected to interface port 240 by physically connecting external device 250 to SEU 230 that may in turn by connected to interface port 240 as demonstrated in FIG. 2 by the line connecting block 250 to 230 and the line connecting block 230 to block 240. An SEU adapted to control communication over an interface port may be hardened and/or otherwise made tamper-proof e.g., in order to make sure it is not easily bypassed or removed. For example, SEU 230 may be firmly or permanently connected to interface port 240 (e.g., by the manufacturer of vehicle 210) such that it cannot be removed from interface port 240. Wiring or other means may be included such that, for example, if SEU 230 is removed from interface port 240 then interface port 240 is rendered useless for interfacing external devices, accordingly, in some embodiments, communication of an external device with an in-vehicle network over an interface port such as interface port 240 may only be possible through, or in the presence of, an SEU 230.

In some embodiments, an external device or system (e.g., external device 250) may be directly connected or coupled to interface port 240, e.g., SEU 230 may be omitted from a system or configuration or SEU 230 may be bypassed. In such embodiments, an internal SEU (e.g., SEU 220 that may be internal to vehicle 210 or to in-vehicle network 215) may provide any functionality as described herein with respect to SEU 230. For example, SEU 220 may block or destroy messages on in-vehicle network 215, may receive a token from external device 250 and may permit or allow a session or block or prevent a session, e.g., based on reception of a valid token from external device 250, based on attributes of a token as described and so on. In some embodiments, an external device or system (e.g., external device 250) may be directly connected or coupled to SEU 230, e.g., SEU 230 may be directly connected or coupled to interface port 240 such that connecting an external device to interface port 240 can be done or achieved only by connecting to SEU 230. As described, in some embodiments, removing a security unit connected to an interface port may cause the removed security unit to generate an alarm and/or communicate with, or configure components in a vehicle. For example, SEU 230 may be directly connected to interface port 240 and connecting external device 250 to interface port 240 may be done only by connecting via or through SEU 230 (e.g., SEU 230 may be connected to interface port 240 such that interface port 240 is inaccessible other than through SEU 230), in such configuration, bypassing SEU 230 by removing it from interface port 240 in order to gain access to ECUs in in-vehicle network 215 may be prevented, e.g., when removed, disconnected or decoupled from interface port 240, SEU 230 may communicate with ECUs in in-vehicle network 215 (e.g., using an onboard power source and communication systems as described) and configure the ECUs such that they do not respond to any request or command, e.g., ignore requests, commands or messages arriving from interface port 240, in other cases, if or when removed, disconnected or decoupled from interface port 240, SEU 230 may shutdown components, e.g., prevent any usage of vehicle 210 and/or prevent any communication with components in vehicle 210, e.g., by shutting down components, configuring components to ignore or block sessions or messages and the like.

A token that causes SEU 230 to permit or allow a session as described (or cause SEU 230 to permit a selected set of operations, access to a selected set of units on in-vehicle network 215) may be received, e.g., by SEU 220 or by SEU 230, from any source. For example, a token may be received from server 260 and/or from another node or computer on network 270. For example, a user may provide server 260 with credentials and/or data identifying a vehicle and server 260 may send a token to SEU 230, based on a token received from server 260, SEU 230 may control a session (e.g., a communication of data between external device 250 and in-vehicle network 215) as described herein. It will be understood that the scope of the invention is not limited by the source or provider of a token or other security code as described herein. Accordingly, a token may be provided to a security unit by a hardware component connected to an interface port or connected to the security unit (e.g., by external device 250 that may be directly connected to SEU 230 or directly connected to interface port 240) or a token may be provided to a security unit over or from an external network, for example, form server 260 over a network that is external to vehicle 210, e.g., over network 270 that may be the internet.

Although SEUs may be physical devices, other configurations may be contemplated. For example, in some embodiments an SEU may be a "virtualized SEU" that may be a software component included in a node on, or connected to, an in-vehicle communication network (e.g., a node on in-vehicle network 215). In some embodiments, an SEU as described herein may be integrated, embedded or otherwise included in a gateway installed in in-vehicle network 215. For example, a gateway connecting a critical and non-critical portions or segments of a network as described herein may include an SEU, e.g., SEU 220 may be a software unit, a hardware unit or a combination thereof that is included in a gateway. For example, an ECU on in-vehicle network 215 (e.g., an engine control unit) may include components of computing device 100, e.g., include a controller 105, executable code 125 and a memory 120, or the ECU may include a combination of software and hardware that provide SEU functionalities in accordance with an embodiment of the invention. In some embodiments, an SEU may also be integrated into the hardware of a node, e.g., in the hardware of a telematics unit. It will be understood that any component, unit, system or device connected to an in-vehicle network and including at least a controller (e.g., a controller 105), a memory (e.g., a memory 120) and computer instructions (e.g. executable code 125) may be used as, or may include, an SEU as described herein. Accordingly, any number of SEUs may be included in a system.

For example, in some embodiments, some or even all of the ECUs connected to in-vehicle network 215 may include an SEU, for example, an SEU may be embedded, integrated or otherwise included in each and every ECU in a vehicle and an SEU embedded, included or integrated in an ECU may enforce security for the ECU in which it is embedded, included or integrated. For example, a first SEU included in a gear control unit may be placed or installed between the gear control unit and in-vehicle network 215 and may selectively block messages or sessions or otherwise control network traffic related to the gear control unit as described with respect to SEU 230, a second SEU integrated into an infotainment control system or unit may control network traffic arriving, or originating at, the infotainment control system and so on. A central or main SEU (e.g., SEU 230 or SEU 220) may communicate with SEUs included in ECUS, e.g., a central SEU may send or forward tokens to SEUs in ECUs, may command embedded SEUs to block messages or sessions or otherwise control operations of embedded SEUs.

According to some embodiments of the invention, an SEU (e.g., SEU 220 and/or SEU 230) may include a number of communication ports. Communication ports included in an SEU may be used for, or may be adapted to, transmitting messages to, and receiving messages from, in-vehicle network 215 and/or interface port 240. For example, SEU 230 may include a first port connected to in-vehicle network 215 and a second port connected to interface port 240. Accordingly, an SEU (e.g., SEU 230) may fully control a flow of messages to/from in-vehicle network 215 and interface port 240. Controlling a flow of messages to/from in-vehicle network 215 and interface port 240 may be done by an SEU included in in-vehicle network 215. For example, SEU 220 (that may be included in in-vehicle network 215) may destroy or block messages arriving from interface port 240. For example, SEU 220 may include gateway functionalities and may be placed in in-vehicle network 215 such that it may examine messages coming from interface port 240 before these messages are sent over, or can be received by units attached to, in-vehicle network 215.

Context, vehicle context or context of a vehicle (e.g., context of vehicle 210) as referred to herein may relate to a state of the vehicle, a state of the vehicle's in-vehicle communication network and/or a state of nodes connected to an in-vehicle communication network. For example, a state or context of vehicle 210 may be defined (and determined, e.g., by SEU 220 and/or SEU 230) responsive to a value for each of at least one parameter, which one or more sensors or nodes in the vehicle provides, for example in a data portion of a CAN message that it transmits. The at least one parameter may for example, include one, or any combination of more than one of, vehicle's speed, acceleration, closing speed to a leading or trailing vehicle, engine revolutions per minute (rpm), engine temperature, oil pressure, hydraulic pressure, wheel traction, road condition, vehicle location optionally provided by a GPS signal, and/or weather condition. State or context of an in-vehicle network, may by way of example, be defined (e.g., by an SEU) responsive to baud rate, which types of messages are being transmitted over interface port 240 and/or in-vehicle network 215 and/or which nodes in in-vehicle communication network (e.g., in in-vehicle network 215) are actively communicating over the network. State of in-vehicle communication network may also include a state or contents of a communication session of which the CAN message is a part.

A context or state of a node may be, for example, an operational stage or phase, e.g., the node is rebooting, the node is in an initialization sage, the node is restarting and so on. A context or state of a node may be related to an error that occurred at the node or network or any other aspect related to the functioning of the node or network. Accordingly, an SEU (e.g., SEU 220 and/or SEU 230) may determine, detect or identify a context based on at least one of: a state or other attribute of a vehicle, an in-vehicle network, and a node connected to the network. For example, by examining messages communicated over interface port 240 and/or over in-vehicle network 215 (and, as described, an SEU may receive any of, or even all, messages sent over interface port 240 and/or in-vehicle network 215) an SEU may know, or determine or identify, the state of the vehicle itself, nodes on the in-vehicle network as well as the state or context of any one of the nodes connected to an in-vehicle network.

An SEU may receive data from components in vehicle 210 and/or from external device 250 and may calculate, determine or deduce a context, possibly based on more than one input from more than one component. For example, a first context may be determined by an SEU if the speed of the vehicle is 40 mph and the rpm is 1,500 and a second, different context may be determined by the SEU if the vehicle is not moving mph and the rpm is 1,500. A context may be determined, by an SEU, based on a lookup table as known in the art, e.g., a table that associates a set of states of, or signals received from one or more of: of a vehicle, an in-vehicle network and nodes on the in-vehicle network with a state. For example, configuration data 133 may include a table that associates a set of states of, or signals received from one or more of: of a vehicle, an in-vehicle network and nodes on the in-vehicle network with a state. Accordingly, any set of states and/or set of conditions and/or set of signals received may be translated, or used for determining a context as described.

An action performed by an SEU (e.g., by a controller 105 included in SEU 220 or in SEU 230) may be or may include, logging or recording an event (e.g., for further or future investigation or analysis), blocking a message received from, or sent to, an external device or system, modifying a message and/or changing a configuration of an in-vehicle network or of at least one of the ECUs connected to the in-vehicle network.

An SEU may include a wireless communication interface for communicating with entities outside of, or external to, an in-vehicle communication network (e.g., external to in-vehicle network 215) via a wireless communication channel. For example, wireless interface unit included in an SEU may provide the SEU with connectivity to a WiFi network, and/or a Bluetooth channel and/or a mobile phone network such as a 3G network. In some embodiments, e.g., in the absence of such a wireless capability, an SEU in accordance with an embodiment of the disclosure may communicate with an outside or external entity over an existing vehicle connection to the cloud.

Operations performed by an SEU as described herein may be performed in real-time. Generally, "real-time" (also known and referred to in the art as "realtime", or "real time") as referred to herein relates to processing or handling of events and acting as described at the rate or pace that the events occur, identified or received (possibly defined by human perception). For example, an SEU according to embodiments of the invention may process messages at the rate or pace messages are received. An SEU may act in real-time, e.g., within milliseconds or other very brief periods after a message is transmitted on an in-vehicle network or received from an external device so that an action related to a message is performed virtually immediately. For example, an SEU may, in real-time, determine that communication with an external device is to be prevented and may block messages received from, or sent to the external device substantially immediately after determining that communication with an external device is to be prevented.

Blocking a message may include destroying a message being communicated over a network or communication bus while the message is communicated. For example, in some embodiments, in order to block a message, an SEU may send a CAN error frame, signal or message on a network of bus that may destroy another message that is currently communicated. In some embodiments, an SEU may corrupt (or destroy) a message while it is being transmitted on the bus by sending data (e.g., one or more dominant bits as known in the art) on the bus during the transmission of the message.

In some embodiments, an SEU may be, may act as, or may include functionalities of, a gateway. Generally, a gateway as known in the art is a unit that controls traffic, e.g., a unit that selectively enables or disables data units (e.g., messages) to travel from a first network to a second network. As described herein, an SEU may selectively enable some messages to enter an in-vehicle network, selectively enable or permit messages to travel from a first segment of a network (e.g., from network segment 216) to another segment (e.g., to network segment 217) and/or selectively prevent messages to enter in-vehicle network 215 (e.g., messages originating at external device 250), selectively prevent messages from exiting in-vehicle network 215, e.g., messages sent to external device 250 may be blocked such that information is not provided to a compromised diagnostics system connected via interface port 240. Accordingly, an SEU as described herein may be, or may include some functionalities of a gateway.

As described, selectively permitting, allowing or enabling messages to be communicated over an interface port and/or between network segments may be based on a token and/or based on configuration data. For example and as described, SEU 230 may block specific messages, specific operations and/or communication with specific ECUs or nodes on in-vehicle network 215 based on attributes or values of a token and/or based on configuration data 133. Accordingly, an SEU may be a gateway that may be dynamically configured by a token. For example, a first token received by SEU 230 from external device 250 may cause SEU 230 to permit external device 250 to freely communicate with any node on in-vehicle network 215, a second, different token, received by SEU 230 from external device 250 (or from server 260 or from any source as described) may cause SEU 230 to permit external device 250 to communicate only with non-critical nodes, e.g., SEU 230 may forward, into in-vehicle network 215, messages sent from external device 250 to an infotainment unit (e.g., an infotainment control unit connected to non-critical network segment 216) but block messages sent from external device 250 to an engine control unit (e.g., an engine control unit connected to critical network segment 217).

As described, an SEU may perform gateway operations with respect to messages communicated into and/or out of, an in-vehicle network, e.g., SEU 230 may be act as a dynamically configured gateway with respect to communication between external device 250 and in-vehicle network 215.

As further described, an SEU may be, or may function as, an internal gateway, e.g., SEU 220 may perform gateway operations with respect to messages sent between segments of in-vehicle network 215. For example, based on a token and as described herein, SEU 220 may selectively block messages sent from a critical portion of in-vehicle network 215 to a non-critical portion or segment of in-vehicle network 215. It will be understood that any operation described herein with reference or respect to SEU 230 may be applicable to SEU 220 and, similarly, any operation described herein with reference or respect to SEU 220 may be applicable to SEU 230.

Reference is made to FIG. 3 that schematically shows exemplary security token, security code or security object 300 (referred to herein as "token" for the sake of simplicity and clarity) according to illustrative embodiments of the present invention. As shown by block 305, an identification (ID) code or value may be included in a token 300. For example, a unique ID may be included in each token such that a plurality of tokens may be identified by an embodiment. An ID as shown by block 305 may be or may include a type, e.g., a first set of tokens may be of a first type and a second set of tokens may be of a second type. An ID may be used in order to track operations related to a token, for example, an SEU may record, in configuration data 133, an ID of a token and record the number of times that token may be used or reused, decrement a counter the number of times each time a token with the recorded ID is used and prevent usage of the token when the counter's value is zero. It will be understood that token 300 is a simplified and exemplary token and that, in some embodiments of the invention, other fields or values may be included in a token or some of the fields, entries, values or parameters included in token 300 may be omitted. In addition, it will be understood that the structure of token 300 is a simplified one that any structure of a token may be used, e.g., a plurality of values or attributes in a token may be encoded into a single value or field.

In some embodiments, a token may be generated based on at least one unique identifier, attribute, parameter or value of, or related to a vehicle (e.g., a VIN, a serial number and the like) and a security unit (e.g., SEU 230 or SEU 220) may be adapted to validate a token based on the at least one attribute. For example, a car or vehicle specific token may be requested, e.g., from server 260, by the car or vehicle owner.

For example, using an application on a smartphone as known in the art, a user that is the owner of vehicle 210 may request a vehicle specific token by providing server 260 with a user name, password and an identification of vehicle 210 (e.g., a VIN or serial number). In other embodiments, using credentials (e.g., user name and password as known in the art), a use may login to server 260 and receive a token for his or her car.

Server 260 may verify or validate (e.g., in a database in storage 261) the user name, password and a vehicle identification (e.g., a record in a database may include the user name, password and a unique identification of a vehicle) and may generate a car or vehicle specific token, e.g., based on a unique identification of the vehicle as described and the server may provide or send the token to the user.

In some embodiments, a token may be generated based on an interaction of a user with a system. For example, in some embodiments, a token may be generated based on an authentication code or token (or security or verification codes or tokens) provided by a user to, for example, a security unit (e.g., SEU 220 or SEU 230) and/or to a server (e.g., an authentication or other code or token provided by a user to server 260).

For example, a process or flow similar to the well-known in the art flow of two-step verification (also known as 2-Step verification or two-factor authentication) may be used such that generation of a token (and/or access to components or data in a vehicle) requires consent, permission, authorization and/or active participation of a user, e.g., an owner of a vehicle needs to execute an application on his or her computing device, generate and/or receive a token and provide the token to a system. For example, access to in-vehicle network 215 may be enabled based on a code provided by an owner of vehicle 210 as described.

For example, when a buyer buys a car, the seller may provide the buyer with a set of unique authentication codes or tokens or with a smart card, chip card or an integrated circuit card (ICC) that includes a unique code or token. A security unit (e.g., an SEU) may be provided with the authentication codes or tokens provided to a buyer (e.g., the set of authentication codes and/or code or token in a smart card as described). In some embodiments, an application e.g., on a smartphone, may generate security, verification or authentication codes or tokens. For example, an application on a buyer's smartphone may generate codes or tokens based on a configuration that includes data provided by a seller, e.g., based on a code that is unique for a user and/or a vehicle.

In some embodiments, a token may be a vehicle-specific token. For example, using a VIN, serial model, or a unique value, number or code associated with a specific vehicle, a unique token that is vehicle-specific may be generated. A vehicle-specific token may be a token that includes a value that is unique for the specific vehicle, for example, a hash or other function that receives or takes as input a VIN (that is unique or vehicle-specific, e.g., no two cars have the same VIN) may produce as output a unique, vehicle-specific token. A vehicle-specific token may include only a vehicle-specific portions, accordingly, any number of vehicle-specific tokens may be generated for the same specific vehicle, for example, a set of vehicle-specific tokens for the same vehicle may all include a portion that is unique or vehicle-specific (e.g., same value in their VSID 345 as described herein) and may further include other portions that may be similar to portions of other tokens. For example, a database included in storage system 261 may include, for a set of vehicles, a respective set of unique IDs that may be used in order to generate vehicle-specific tokens, e.g., by inserting the unique ID in VSID 345 in a token as described herein.

A vehicle-specific token may be generated by a user associated with the vehicle (e.g., the owner of a car) and/or by a server, e.g., by server 260 that may be operated by the vehicle manufacturer. For example, provided with a VSID as described (e.g., a VSID stored on a user's computer or smartphone), an application executed on a computing device of a user or an owner of a car (e.g., an application on a smartphone as known in the art) may generate a vehicle-specific token that may enable access only to a specific car as described. In another embodiment, using his credentials, a user may login to server 260 and server 260 may generate a vehicle-specific token for the user, e.g., a database in storage system 261 may include an entry with a user name, password and a VSID, accordingly, having verified a user, server 260 may use an associated VSID to generate a vehicle-specific token and send (or otherwise provide) the vehicle-specific token to the user.

Accordingly, a user (e.g., an owner of a car) may authorize or enable access to components in his or her car. For example, upon arriving at a garage, a user may use his or her smartphone to generate or receive a token or code (or may use a code or token otherwise provided or obtained as described) and may provide the code or token to a mechanic, the mechanic may enter the code or token to external device 250 and external device 250 may use the code or token to access an in-vehicle network, e.g., use the token for authentication as described.

For example, a request for a car (or vehicle) specific token may include at least one unique identifier of the vehicle (e.g., a VIN) and server 260 may generate a token based on the unique identifier. A unique attribute or identifier may be known to an SEU, e.g., SEU 230 may be provided with a VIN of the vehicle in which SEU 230 is included, accordingly, an SEU may validate a vehicle specific token based on a unique attribute or identifier of a vehicle. For example, the logic used by a generator of a token may be known to an SEU, e.g., the function that encodes a VIN into a token may be known to an SEU. Accordingly, an SEU may examine a token and determine a VIN or other unique identifier used for generating (or encoded in) a token so an SEU may validate a vehicle specific token by determining whether or not the vehicle specific token includes, or was generated based on, a unique identifier of the vehicle.

As shown by block 310, a token may include an identification of vehicle 210, e.g., in the form of a VIN as known in the art. The VIN of vehicle 210 may be included in configuration data 133, accordingly, an SEU receiving a token with a VIN as shown by block 310 may verify or validate the token based on a VIN or other identification of the vehicle that is included in configuration data 133. As shown by block 315, a token may include a time parameter. For example, time parameter may indicate a time window (e.g., in the form of date, start time and end time) during which the token is usable, for example, SEU 230 may permit external device 250 to communicate with components on in-vehicle network 215 only during a time window indicated in a token. A time parameter as shown by block 315 may indicate a duration of a session, e.g., based on a time parameter as shown by block 315 an SEU may terminate a session between external device 250 and a component in in-vehicle network 215 2 hours after the session is established, accordingly, a token may not be usable for an indefinite time period or for unreasonable time periods, e.g., days or weeks.

As shown by block 320, a reuse parameter included in a token may indicate or dictate the number of times the same token can be used. The reuse value as shown by block 320 may be used, e.g., by an SEU as described, in order to enable using the same token or code a predefined number of times.

As shown by block 325, a token may include an identification of an event. For example, an SEU may terminate a session (e.g., block messages to/from external device 250) if an event indicated in block 325 is identified. An event may be identified or detected, by an SEU, based on a message received from an ECU. For example, starting the engine may be an event that may cause an engine control unit to send an "engine ignited" message and such message received by an SEU may cause the SEU to identify the event. Any event related to a condition, state or context of vehicle 210 may be represented or indicated as shown by block 325, accordingly, an embodiment may disable or otherwise control a communication over an interface port based on an event.

As shown by block 330, a token may include an identification of nodes. For example, an identification, representation or type of nodes included in a token as shown by block 330 may cause an SEU to enable, permit or allow external device 250 to communicate only with the indicated nodes and disable, prevent or block external device from communicating with other nodes. An indication of nodes may be or may include a node type, e.g., a type value in block 330 may cause an SEU to enable external device 250 to communicate with non-critical nodes only. A value in block 330 may be a "whitelist" as known in the art, e.g., include all nodes with which communication is allowed or the value in block 330 may be a "blacklist" as known in the art, e.g., include all nodes with which communication is to be blocked.

As shown by block 335, a token may include an indication or representation of operations. In some embodiments, a token may be used in order to either allow or forbid (or either enable or prevent) specific diagnostics services. For example, based on a first token, an SEU may permit a diagnostics system (e.g., external device 250) to read logs from a first set of ECUs but prevent (e.g., by blocking read requests) the diagnostics system from reading logs of a second set of ECUs. In another example, based on a first token, a diagnostics system may be enabled or permitted (e.g., by an SEU as described) to perform diagnostics operations that involve changing an operational mode of an ECU (e.g., configuring an ECU as described) and, based on a second token, the diagnostics system may be permitted or enabled to read data from ECUs but prevented from configuring ECUs. For example, various combinations of values in nodes 330 and operations 335 in a token as described herein may enable various configurations, accordingly, an embodiment may be dynamically configured (e.g., by a token as described) to selectively enable an external device to perform specific diagnostics services or operations with respect to a specific set of nodes or ECUs and further prevent the external device from performing other diagnostics services or operations. It will be understood that any combination of services or operations and/or nodes or ECUs (e.g., in the form of whitelists and blacklists as known in the art) may be implemented using data in a token, e.g., as described with reference to FIG. 3.

For example, a value in block 335 may indicate that only read operations are allowed and, accordingly, based on such value, an SEU may permit or enable external device 250 to read data from nodes in in-vehicle network 215 but may further prevent external device 250 to write data to nodes in in-vehicle network 215, e.g., prevent external device 250 from configuring nodes, updating firmware and the like. As shown by block 340, a context may be included in a token and may be used, e.g., by an SEU in order to control traffic to/from in-vehicle network 215. For example, a reset or reboot of a node may be a context indicated as shown by block 340 (and identified by an SEU as described) and an SEU may prevent external device 250 from communicating with the node (and thus possibly interfering with a boot sequence) based on the context. As shown by block 345, a token may include a vehicle-specific ID (VSID) that may uniquely and/or specifically identify a vehicle. For example, a mathematical function applied to a unique attribute or identification of a vehicle (e.g., a VIN, a serial number or other unique number, e.g., associated with the vehicle by the manufacturer) may produce a VSID that may make the token a vehicle-specific token. For example, the VSID may be provided to SEU 230 and SEU 230 may verify that a received token is indeed specific for vehicle 210 by verifying that VSID 345 in the token is same as a VSID stored in configuration data 133.

In some embodiments, e.g., in order to keep a token small, the fields, entries or values as shown by token 300 may be stored in configuration data 133 and may be associated with a token ID and/or token type. For example, a list, table or other construct or object in configuration data 133 may include, for a set of token types, a respective set of entries, that may be similar to token 300. Accordingly, based on a type of a token received by an SEU, the SEU may determine how to control network traffic as described herein.

Disabling a component connected to the network may be done, e.g., by an SEU, by communicating with the component and configuring the component. For example, SEU 230 may send, over an in-vehicle network and to an infotainment control unit, a message that will cause the infotainment control unit to shut itself off.

Any protocol or message types or formats needed in order to communicate with nodes on an in-vehicle network may be known to an SEU, accordingly, an SEU may be able to readily and freely communicate with nodes on an in-vehicle network. Accordingly, an SEU may configure or re-configure nodes, may obtain data or information from nodes (e.g., their state and the like) and may, for example, turn nodes on or off.

Disconnecting or isolating a portion of an in-vehicle network from the rest of the in-vehicle network may be done or achieved by an SEU by configuring nodes on an in-vehicle network. For example, in order to isolate a segment or portion of in-vehicle network 215, SEU 220 (or SEU 230) may send a message to a gateway in in-vehicle network 215 (not shown) instructing the gateway to prevent any data from flowing between a first and a second segments of in-vehicle network 215. In some embodiments and as described, an SEU may be, or may include functionalities of, a gateway, accordingly, in order to isolate or disconnect a portion of an in-vehicle network from the rest of the in-vehicle communication network, an SEU may block messages, e.g., block messages sent to and/or originating from, a portion of a network thus effectively isolating or disconnecting the portion of the network. For example, an SEU may include a number of ports, each connected to one of a number of network portion, in such configuration, in order for a message to travel from a first network portion or segment to a second network segment, the message must pass through the SEU, accordingly, the SEU may isolate any segment from the rest of the segments or network, e.g., by blocking messages to/from the network segment. For example, network segment 216 may be connected to the rest of in-vehicle network 215 via a first port of SEU 220 and network segment 217 may be connected to the rest of in-vehicle network 215 via a second port of SEU 220, accordingly, by selectively discarding or blocking messages, SEU 220 may isolate network segments 216 and 217 from the rest of in-vehicle network 215. Accordingly, an embodiment (e.g., a processor in an SEU) may be configured to isolate a portion of an in-vehicle network from the rest of the in-vehicle communication network.

Activating a component connected to the network may done or achieved for example, by an SEU by sending a message to the component. For example, using protocols and message formats stored as described, an SEU may send a message to an environment control in order to turn the air conditioning on or off. Blocking a message may include causing a component to selectively block (e.g., drop as known on the art) messages. Delaying a message by an SEU may include storing the message and transmitting the message at a later time.

Logging a message may include storing any information related to a message. Information or data logged or stored as described may include forensic information that may include, for example, description or attributes of previous messages sent or seen on a network, contexts (e.g., a number of contexts in a context vector) of a vehicle, network or nodes, and any other parameters or values that can help an offline analysis of an attack. Logged, stored or recorded information may include any, or all of the, information required in order to recreate an in-vehicle decision regarding a message or attack in an offline procedure. For example, by storing all messages sent to, or received from, an external device, contexts and data internal to an SEU, the performance and decision making of an SEU may be examined and/or debugged as known in the art and characteristics of an attack may be determined. Logging, storing or recording information as described may be done in a secure portion of a system or network. For example, a Hardware Security Module (HSM) may be connected to an in-vehicle network and may be used to store, log or record data such that only authorized entities (e.g., a technician or an SEU 40) may be able to access stored data.

For example, an SEU may store, in for example storage system 130, the time a message was received from external device 250, the source and destination of the message, some or all of the content (payload) of the message and any other information or data related to the message. Warning or alerting may include sending a text message, electronic mail or any other message. For example, an SEU may send a message to a telematics unit connected to in-vehicle network 215 and the telematics unit may send a message (e.g., a short message service (SMS) message or an electronic mail (email) message) to a specified recipient list. Warning may include, or be done, using components in a vehicle. For example, an SEU may cause (e.g., by sending a message as described) an infotainment unit do display a warning message, sound an alarm and so on.

Controlling a communication related to an in-vehicle network as described may be, or may include, controlling communication sessions. For example, as known in the art, in order for a first computing device to communicate with a second computing device, a session may need to be established, for example, the three-way handshake in Transmission Control Protocol (TCP) establishes a session, in a similar fashion and as known in the art, a vehicle diagnostic or service session may be established using a security access code (or other security service or protocol) and an SEU may selectively permit such diagnostic session to be established, or prevent establishment of the session, e.g., based on a token as described.

An SEU may control communication related to an in-vehicle network, e.g., control communication between external device 250 and components on in-vehicle network 215 at, or based on, a session level. For example, SEU 230 may disable a session from being established by blocking a message designed to establish a session, or SEU may terminate a session by sending a message designed to terminate the session to an ECU on in-vehicle network 215 and/or to external device 250. At any point, an SEU may send or record information related to a session, for example, upon blocking or terminating a session, an SEU may send an error or other message, e.g., to an initiator of the session. An SEU may record and log (e.g., in recorded data 122) any data related to sessions, e.g., failed authentication attempts, sessions that were not initiated or terminated properly (e.g., according to a specific protocol), time and date of session, duration of sessions, components participating in a session and/or any other data related to a session. In some embodiments, an SEU may record entire sessions, e.g., capture and store in recorded data 122 each and every message communicated in a session, accordingly, sessions may be replayed, e.g., for diagnostics or forensics as known in the art. Embodiments of the invention may protect an in-vehicle network from a compromised diagnostics system and/or from a compromised diagnostics port, e.g., embodiments of the invention may protect an in-vehicle network from a compromised diagnostics system that communicates with the in-vehicle network via a diagnostics port and/or protect an in-vehicle network from a compromised diagnostics system connected directly to an ECU in the in-vehicle network.

It will be understood that the presented security systems and methods are not limited to the described scenarios and may also be relevant to other scenarios. Specifically, some of the security systems and methods described for a switched connection may also be relevant for a direct connection. For example, SEU 220 may protect in-vehicle network 215 from a compromised external device 250 when external device 250 is directly connected to interface port 240, SEU 230 may protect in-vehicle network 215 from a compromised external device 250 when external device 250 is directly connected to SEU 230 and SEU 220 and/or SEU 230 may protect in-vehicle network 215 from a compromised external device 250 when external device 250 is indirectly connected to in-vehicle network 215, e.g., when a remote external device 250 communicates with in-vehicle network over a switched or other network or device, e.g., when external device 250 is connected to a local network in a service garage or when external device 250 communicates with in-vehicle network 215 over network 270. As described, control of sessions and communications may be done, by an SEU, based on examining messages, accordingly, it will be understood that the scope of the invention is not limited by the system or method used for communicating messages to/from an external device, accordingly, the scope of the invention is not limited by the location of external device 250 with respect to vehicle 210, e.g., external device 250 may be near vehicle 210 or may be geographically remote. A diagnostics system may be connected directly to an in-vehicle ECU (for example a vehicle gateway). This ECU may be responsible for passing diagnostics messages to the rest of the in-vehicle networks and ECUs. In such a scenario, some of the potential attacks scenarios may be, for example, a compromised diagnostics station at a repair shop or dealership is connected to a vehicle; a trojan on a diagnostics station may communicate or manipulate traffic between a diagnostic station and a vehicle (e.g. transmit an infected firmware to an ECU); and an insecure OBDII device connected to an OBDII port may be compromised and send untrusted IP/CAN traffic. It is assumed the internet protocol (IP) stack is complex enough in order for a system and method to take into consideration the potential for an implementation vulnerability that may allow remote execution on a gateway module.

An embodiment may selectively filter messages coming from an external port. Selective filtering may include filtering or blocking portion of messages or modifying incoming messages such that only a portion of an incoming message is sent into an in-vehicle network. For example, some CAN messages originating from an OBDII port should be allowed into an in-vehicle network, for example, in order to comply with the US Clean Air Act Amendments of 1990.

However, some of the CAN messages may have undesired effects on the operation of the vehicle and in some cases should not be allowed into the in-vehicle network.

A filtering mechanism may be used, e.g., by an SEU, in order to make sure only "whitelisted" CAN messages are allowed into the in-vehicle network. For example, configuration data 133 may include a list of messages that are to be allowed into in-vehicle network 215. A filtering mechanism performed by an SEU may use a predefined security policy that describes these "whitelisted" messages. For example, based on a policy or other configuration in configuration data 133, an SEU may allow the "read only" parts of Unified Diagnostic Services (UDS) protocol messages (e.g., messages querying for PIDs, Read DTC Information and such) to enter in-vehicle network 215. Optionally the security policy will block all other messages from entering the vehicle.

Advanced filtering may be required in order to block advanced attacks such as denial of service attacks. For example, an SEU may perform filtering that limits the frequency of incoming messages to be below a pre-defined threshold. For example, SEU 230 may allow no more than 5 messages with an ID of 17 coming from external device 250 to enter in-vehicle network 215.

IP messages coming from an external source (e.g., external to in-vehicle network 215) may be classified. For example, an SEU may classify incoming IP messages into one of the following groups or categories: DOIP messages; Other supported IP protocols in the network (if such exists) and Other messages. Other categories may of course be used.

In order to prevent potential attack scenarios, an SEU may filter IP traffic. For example, filtering may include discarding or blocking any message that is not a DoIP message and/or is not an IP message and verifying other messages, e.g., verifying the messages are from a known source, destined to a known destination, include a specific payload and the like. Examination of IP messages may be done with respect to any network layer as known in the art, e.g., an SEU may inspect the layer 4 (according to the Open Systems Interconnection (OSI) model) of messages (e.g., source/destination addresses, ports and the like) and/or an SEU may inspect the OSI layer 7 of messages, e.g., perform deep-packet inspection as known in the art. For example, using layer 7 inspection, an SEU may validate DoIP traffic (and optionally other protocols, such as AVB or SOME/IP).

Authorized entities (e.g. dealerships, repair shops) may be required to be able to send diagnostic messages and initiate diagnostic sessions with the different ECUs in a vehicle. Such scenarios may include sending messages that are not "read only", meaning they may for example change the configuration and/or software of the vehicle ECUs.

As these diagnostic messages may alter the behavior of the vehicle in potentially unexpected ways these messages may be considered potentially dangerous. Authenticating diagnostics layer, e.g., by an SEU, may prevent (or at least make it more difficult for) a potential attacker to send these messages to a vehicle.

An SEU may integrated into a CAN driver and/or the DoIP layer of an ECU in. Accordingly, an SEU may enable or prevent a diagnostic session for a specific ECU and/or for other ECUs in the vehicle (e.g., an SEU may be included in a gateway ECU).

In order to initiate an authenticated session with the vehicle, an authorized user may be required log into a backend (optionally cloud based) system (optionally using the diagnostic software). Once logged in, the communication between the diagnostic terminal and the vehicle is authenticated, for example, by using a security token that is passed between the terminal and the vehicle, or by encrypting the session. Only verified diagnostic sessions may be allowed into the vehicle.

In one embodiment, e.g., in order to protect a system from replay attacks (e.g., a reuse of a token as known in the art) a timeout may be used, e.g., a limited time period or window may be associated with a token and, when the time window expires, the token is marked or considered invalid or expired such that it can no longer be used. For example, in cases when control cannot be session related or at a session level then a time out may be used. For example, the CAN protocol does not support sessions and, accordingly, preventing reuse of tokens for multiple sessions may not be possible when CAN is used, in such case, an embodiment may use a time out as known in the art, e.g., a token may expire after a predefined time period or interval. For example, an SEU may record the time a token was first received or seen and, after a predefined time interval elapses, the SEU may include the token in a blacklist, e.g., a blacklist or invalid tokens, thus effectively making or marking the token invalid.

The login credentials of an authorized users might be stolen and used by malicious entities for example over a compromised OBD dongle. However, this added security layer may complicate matters for a potential attacker, and it also offers traceability to what had happened in the vehicle, as the backend would be involved in these scenarios and will be able to detect an abuse of a user's credentials by analyzing the use patterns and looking for usage anomalies. The backend may also alert upon such an event and optionally disable the compromised credentials.

It is also possible, according to some embodiments, to add another security layer in order to address the issue of stolen credentials. This layer may introduce physical "secure keys" that would be distributed to authorized repair shops. The "secure keys" may play a role in the security handshake so that a user will have to both "know" a secret password and also "posses" the "secure key" in order to prove its authenticity.

An interactive confirmation security measure may be used, by some embodiments of the invention, in order to prevent stolen credentials from being used by a compromised dongle or diagnostic terminal or port. An interactive confirmation security measure may require a human to interact with a system in addition to supplying the credentials. In this added interactive confirmation, once the security layer has verified a security token as described, a system may not directly allow the diagnostic session. A system may first send a message to a head unit of a vehicle or a similar interactive module of the vehicle in order to ask an operator of the vehicle whether this diagnostic session is to be allowed or not. Only once a positive response has been received may the security layer of a system allow the diagnostic session.

In some embodiments, instead of communicating with an interactive module of the vehicle in such a way, the security layer may only wait for a message coming from such an interactive module (that may be generated, for in example, due to a special, e.g., long-press on a button). The combination of a valid security token and the signal coming from another vehicle module in a specific time frame may cause an SEU to allow or enable the diagnostic session (e.g., rather than block or prevent as described).

In some embodiments, an interactive technique as described may also remove the need for a security token altogether (thus optionally eliminating the need for backend and/or "secure key" integration). In this option, a signal coming from another vehicle module may instruct the security layer to allow the diagnostic session.

An exemplary flow of secure diagnostics using a diagnostic terminal may include for example an authorized user enters a secure key/password in the diagnostic terminal, timestamps are synced between an in-vehicle security layer (e.g., implemented by an SEU) and an external component (for example cloud component and/or diagnostic terminal), diagnostic terminal requests a diagnostic certificate from the cloud component, providing, for example, vehicle identification number (VIN) or other number identifying the vehicle, password and username, diagnostic software (e.g., in an SEU) receives "Allow all diagnostics" token for the current time slot, signed with a cryptographic key that is associated with that VIN, an "Allow all diagnostics" token is passed to the in-vehicle security layer (e.g., to an SEU), the SEU requests multimedia system to display "Allow diagnostics" query?" and, if user clicks "OK" then the SEU allows the diagnostic session to proceed, otherwise, the SEU blocks the session.

In some cases, or scenarios, an attacker may be able to find a code execution vulnerability on an ECU connected to a diagnostic port and use it to take over the ECU, thus bypassing any potential security layers included in the ECU. In some embodiments, in order to limit the amount of control an attacker may have in this scenario, different execution environments of the ECU as well as the mechanism to separate between them may be used. Accordingly, in some embodiments, although the attacker was able to execute code on the ECU, the effects of this code are limited. For example, an attacker that was able to compromise an ECU through an IP vulnerability will not be able to bypass a CAN filtering mechanism and send arbitrary CAN messages to the rest of the ECUs in the in-vehicle networks.

For example, an ECU that has multiple cores (e.g., a multi-core CPU as known in the art) may be used. For example, the IP stack of the ECU may be executed on a different core than the one used to control the CAN. In some embodiments, access to the peripherals used, as well as access to the shared cores' memory may be configured in a secure manner in order to properly separate between the cores.

Some embodiments of the invention may prevent a change made by a malicious attacker to an ECU software to be permanent, e.g., by validating software of the ECU after each boot or reset and alerting (or disabling the ECU) if a change to software of the ECU is detected.

Since the limitation on a general diagnostic session may not be very strict (for example as per "right to repair" legislation, requiring information necessary to perform repairs to be made available to independent repair shops), a strong enforcement focused on authenticated software download may be required in order to prevent malicious (or non-official) firmware from being downloaded into the target ECUs.

This may be achieved by modifying the reprogramming code of the ECUs in the vehicle so that code in an SEU may check the authenticity of the new software. The authenticity check may be performed for example by attaching a digital signature to the new software and testing its authenticity before finalizing the update process. Since the software download in this scenario may be through a centralized or designated location entity or node, e.g., an SEU such as SEU 220, that may be adapted to receive and authenticate or validate software downloads, it is possible to verify the authenticity of the new software in an SEU, prior to passing it along to the rest of the ECUs in a centralized fashion, thus reducing potential costs and complexity of verifying this at the individual ECU level. This may be achieved, in some embodiments, by, for example, integrating a security layer into the DoIP stack of an ECU and the security layer in the DoIP stack may be adapted to verify downloads as described.

As described, a diagnostic connection may be connected to or through a network bus or switch. Specifically, an Ethernet connection may be routed through a switch or optionally a set of switches, to other ECUs in a vehicle. The switch may be directly connected to the diagnostic port. It may also be connected to the diagnostic port through a vehicle ECU that may act as a gateway ECU.

In a direct connection scenario, each ECU connected to an IP network may implement its own security layers (e.g., include at least a portion of an SEU as described herein) as they may all be equally exposed to the potentially compromised environment of the diagnostic connection. Security provided by some embodiments in this case may be based on similar concepts as described for the direct ECU connection, only this time they are not limited to the gateway ECU and they may be integrated into each of the relevant ECUs. E.g., each ECU connected to an in-vehicle network may include components of an SEU as described herein.

Interactive confirmation may be made possible but may be more complex in this scenario, as this confirmation may be spoofed. In order to prevent spoofing, an SEU in an ECU may digitally sign a confirmation request message. The ECU receiving the authentication may check the validity and authenticity of the confirmation.

In some embodiments, some of the ECUs connected to an Ethernet switch may also be connected to other in-vehicle networks. These networks may for example be CAN networks. These ECUs may be based on more than one microprocessor. For example, in some embodiments of the invention, one microprocessor of an ECU may be connected to the Ethernet network, while another, different microprocessor of an ECU may be connected to the CAN network. These microprocessors may communicate with each other. As described, these ECUs may potentially be compromised.

As discussed, it may be advantageous to prevent compromised ECUs from negatively affecting the behavior of the vehicle by sending arbitrary CAN messages to the in-vehicle networks.

Accordingly, in some embodiments, a security layer (e.g., an SEU or functionality thereof) may be integrated into these ECUs. A security layer may restrict the outgoing traffic from compromised ECUs to the in-vehicle networks. An embodiment may make it possible to disable this restriction, e.g., in order to allow advanced diagnostic sessions only after proper authentication.

In some embodiments, a security layer (e.g., an SEU) may be integrated into an ECU's microprocessor that is connected directly to a network. However, in some embodiments, for example, depending on the available resources on this microprocessor (or for various other reasons), this may not be possible and a possible alternative solution provided by some embodiments may be to integrate the security layer into the microprocessor that is connected to the Ethernet network. In this approach, the security layer may be integrated into the lowest possible communication layer with the CAN microprocessor, in order to prevent an attacker who has already gained some access to these systems from bypassing the security layer. Depending on the system architecture, a security layer (e.g., an SEU or functionality thereof) may be integrated for example into the Serial Peripheral Interface (SPI) software driver of the system.

It may be advantageous that the firmware of microprocessors in an ECU cannot be updated without proper authentication. Specifically, this may be advantageous for a microprocessors connected directly to a CAN network in an in-vehicle network. In some embodiments, authentication may be achieved by adding an authentication layer (e.g., in the form of an SEU functionality) to the microprocessor's bootloader. Depending on the size of the firmware and the free flash space on or of microprocessors, there may not be a way to properly roll back an authorized firmware update, and these microprocessors may be inoperable in case such an attack would take place. In some embodiments, a firmware validation for a microprocessors connected to the CAN may be performed on the microprocessors connected to the Ethernet network. This may prevent the scenario resulting an inoperable microprocessor, but the downside in this scenario may be that the update process on the Ethernet microprocessors may be compromised in case of an attack on these microprocessors that has gained high enough privileges on the operating system (e.g. an attack has managed to gain root permission as known in the art), this may be avoided, in some embodiments, by utilizing trusted execution environments of these microprocessors, if such exists.

In some embodiments, a connection to an in-vehicle network is made through or via a gateway. For example, a diagnostic port may be connected to a gateway module or unit (e.g., gateway 80) which in turn may be connected to an in-vehicle network. This configuration may allow the gateway to limit traffic between the diagnostic port and the rest of the in-vehicle networks.

For example, the gateway module may have at least two Ethernet ports. In some embodiments, these Ethernet ports may be configured to be independent (e.g., such that packets cannot by passed between ports). In some embodiments, the gateway may be adapted to reconfigure the Ethernet ports to be switched, thereby enabling packets to be passed between the two ports and "unlocking" the diagnostic connection to the rest of the vehicle. The gateway may for example make this decision based on receiving a security token from a diagnostic port. A security token may be authenticated by cryptography (for example by using digital signatures).

In order to preserve the network bandwidth (especially for ECU reprogramming use cases), the IP traffic coming from the diagnostic port may not be going through the CPU of the gateway module. The two ports of the gateway may be switched together. The described security concepts for the direct connection scenario can be applied to this scenario.

In some embodiments, unlocking (or opening) a gateway, e.g., causing a gateway to allow or permit an external device to communicate with an in-vehicle network, may be performed by using cryptography, however it may also be possible to utilize an interactive confirmation approach as described according to some embodiments herein. Unlocking (or opening) a gateway, e.g., by authenticating an external device or a session such that a gateway permits or allows the session (or permits or allows the external device to communicate with components in an in-vehicle network) may eliminate the need to integrate a security layer into all ECUs, as the unlocking is already done at the gateway level.

In order to increase the security posture of the system, in one embodiment a switch (e.g., embedded in external device 250 or used to connect device 250 and interface port 240 as known in the art) may be configured in a manner that will limit attacker's ability to perform media access control (MAC) spoofing and other attacks on the network as known in the art. For example, the switch may be configured to use static MAC addresses on fixed (non OBD) ports. The switch may also be configured to only allow known MAC addresses into the fixed ports. The switch may also be configured to disable broadcasts. This may mean the switch will not learn new MAC addresses and routes and, among other things, prevent MAC spoofing and also prevent an attacker's ability to turn the switch into a hub which may then lead to an attacker's ability to interfere with legitimate TCP connections or ability to inject UDP packets.

Optionally, a switch may be configured to limit packet rate in order to help prevent denial of service attacks on the network. As the required bandwidth on the non OBD ports of the switch may not be very high, the switch may be configured to limit the rate of packets there to an acceptable level. The diagnostic interface of the vehicle may not be the only potential attack vector or entrance into the vehicle. For example, other attack vectors may include the telematics system and/or the multimedia system. Since an in-vehicle Ethernet/IP network may not be trusted, some of the previously described security concepts may need to be adopted.

An approach taken by some embodiments may include configuring every ECU in the in the IP network use a different virtual local area network (VLAN), while the diagnostic port and the gateway ports may act as trunks, thereby allowing cross domain communication. This approach may limit the attacker's ability to use a compromised ECU to affect other ECUs or the in-vehicle networks connected to them, as the cross domain traffic must go through the gateway which may filter it according to the security policy. A possible improvement of the approach would be to have the diagnostic port connected to the switch through a switch, similar to what was described in an earlier section, and in addition have every ECU use a different VLAN, while the gateway acts as the trunk. This makes the gateway responsible for all communication going into the vehicle (from the diagnostic port) as well as any cross domain communication. This may mean that only the gateway needs to implement the authenticated diagnostics layer.

As described, a security system (e.g., an SEU) may be connected to a centralized backend (optionally cloud based). This backend may collect information from vehicles in a fleet, aggregate it, analyze it and potentially provide insights and/or recommendations to a fleet manager. Based on data from a plurality of SEUs, a backend system or server (referred to herein as "backend") may provide reports on a fleet's cyber health and optionally alert an operators of the fleet with real time alerts (e.g., using SMS or email messages) regarding specific security related events in the fleet. A security policy of the system may be updated over time. This may be in response to new security events discovered through the information collection done by a backend. An update of a security policy may be in response to any new information regarding potential cyberattacks on the fleet or on any of the fleet's components. An update of a security policy may be performed in real time, without affecting the vehicle's operation. An update of a security policy may replace the entire software of a security system or only replace parts of the software.

A trusted clock may be advantageous for system operation. A trusted clock as referred to herein may be any system, method or device that provides at least two entities with a time value such that it is guaranteed that the at least two entities are time synchronized. For example, in some embodiments, some of the security layers described herein may require or use a trusted clock. For example, in some embodiments, a trusted clock may be required for the creation and validation of a security token. In some embodiments, a trusted clock may be required for the management of encryption keys and certificates, for example for the purpose of expiration of aforementioned cryptography material.

However, a trusted clock may not always be present in a system. Specifically, a system may need to have its clock synchronized in some manner with the clock of external systems. For example, some vehicles do not have a trusted or reliable clock.

In some embodiments, a component in a vehicle may be adapted to keep track of time value using a clock register. A time value may not necessarily be the correct time, and it may not necessarily be synced with the time of any other vehicle in the fleet or with the time in the backend infrastructure that attempts to sync time with the vehicle. For example, a register may be implemented as a software variable. In some embodiments, a register may be implemented using a hardware register. A time value may be stored in the memory of a system on chip. A time value may be stored in a persistent memory. A time value may be initialized using a built in or external RTC (real time clock) component.

In some embodiments, a time value kept by a vehicle may be sent to the backend infrastructure. A backend as known in the art may be any system (e.g., a server) that provides services. A time value may be sent to the backend periodically or upon request. A time value may be sent there when the system boots up.

In some embodiments, a backend infrastructure may keep track of the vehicle time value. A backend infrastructure may store a vehicle's time value in persistent storage. A backend infrastructure may keep the real time value (as perceived by the backend infrastructure) alongside the vehicle's time value (which may be different).

A backend infrastructure may use a vehicle's time value together with the time it was collected in order to generate an estimation of the current vehicle time value. This may be done by looking at the time passed since this vehicle time value was collected and advancing it accordingly.

A backend infrastructure may use an estimated vehicle time in scenarios that require synchronized timestamps. For example, estimated vehicle time may be used in digital signatures that should be expired sometime after the time they were generated at. A component or unit in a vehicle may be adapted to check the current time value relative to a digital signature timestamp.

A backend infrastructure (e.g., server 260) may check a vehicle's time to make sure that it properly advances over time in order to detect malicious activity. Once a mismatch is detected, a backend infrastructure may choose to act upon it. Possible actions may include alerting and alterations to how the backend infrastructure communicates with the vehicle. For example, a backend may choose to stop communicating with a vehicle until further action is performed.

A unit (e.g., an SEU) in a vehicle may optionally reset or zero a time value upon boot. In order to make sure attackers will not be able to take advantage of this, an SEU may keep track of the number of boots. The timestamp sent to the backend infrastructure may include the boot count. A backend infrastructure may make sure the boot count is increasing. The boot count may be used in addition to the time values in both the vehicle and the backend infrastructure.

An SEU in a vehicle may optionally divide a time value to two separate values—e.g., a most significant bit or byte (MSB) and least significant bit or byte (LSB) values of the time value as known in the art. An SEU in a vehicle may advance the MSB by a value of 1 whenever the LSB overflows. An SEU in a vehicle advance the MSB by a value of 1 upon every boot. An SEU in a vehicle may optionally initialize the time value with a random value upon boot. In some embodiments transmission of time related data as described herein may be encrypted. In some embodiments, communication between a vehicle and a backend infrastructure may be encrypted. In some embodiments, communication between the vehicle and the backend infrastructure may be authenticated.

An embodiment may provide, include and use a one-time token for accessing an in-vehicle network. For example, an embodiment may include an in-vehicle network including an interface port for connecting an external device to the in-vehicle network, e.g., interface port 240 may be an OBDII port that may be included in, or connected to, in-vehicle network 215. An embodiment may further include a security unit (e.g., SEU 230) connected between the in-vehicle network and the interface port and the security unit may be adapted to enable the external device to communicate over the interface port based on a code (that may be a one-time token) received from the external device.

A one-time token as referred to herein may be any token, code, digital object or value that may be used, e.g., for authentication purposes, only once or only a limited, predefined number of times. For example, an SEU, firewall, gateway, e.g., SEU 230 that may be physically located such that it can block or prevent data communication between external device 250 and in-vehicle network 215, may be provided with a set of security tokens, security codes or PINs and may only enable communication over interface port 240 if one of the tokens, codes or PINs are provided by an entity attempting to communicate over interface port 240.

In some embodiments, each of the tokens, codes or PINs may be allowed to be used only once and the set of tokens, codes or PINs may be kept by an owner, administrator, operator, dealer and/or any trusted entity. For example, an owner of a car or a dealer may provide tokens only to trusted users or entities that require authorized access, e.g., a dealer may provide tokens to a service garage, owner of a car and the like.

In some embodiments, a token may be used to enable communication over an interface port a predefined number of times and then may be expired or otherwise made unusable for communication over the interface port. For example, SEU 230 may record the number of times the same token, PIN, code or value was used and, when the number of times reaches a threshold value (e.g., 3), SEU 230 may mark the token, PIN, code or value as invalid or SEU 230 may simply remove the token, PIN, code or value from the list of valid or usable tokens, PINs, codes or values. Accordingly, an embodiment may be adapted to enable a communication over an interface port using the same code a predefined number of times wherein the predefined number of times may be just one time (e.g., in the case of a one-time token) or any other number of predefined times.

An embodiment, e.g., an SEU, may, e.g., after receiving a token as described, enable, permit or allow communication over an interface port for a predefined or limited period of time. In some embodiments, an SEU may, e.g., after receiving a token as described, enable, permit or allow communication over an interface port until a predefined event occurs, for example, an event may be an ignition of a vehicle's engine, disconnecting an external device from an interface port and the like. Accordingly, an embodiment may be adapted to interrupt, prevent, block or otherwise prevent or disable communication over an interface port based on at least one of: a predefined time interval and an event.

Tokens, PINs, codes or other value useable for security and/or authentication as described may be provided, e.g., to SEU 230 and/or SEU 220 in various ways, e.g., by or using a hardware component connected to interface port 240 or over or via a network, e.g., tokens, PINs or codes may be sent from server 260 to SEU 230 over network 270, e.g., using a telematics unit in network 215 as described, using Bluetooth as known in the art, or tokens may be provided to a system using a dongle which is inserted into interface port 240 (e.g., a dongle adapted to fit into an OBDII port as known in the art).

A token, PIN or other security code as described herein may be associated with, or may include metadata. For example, a specific token may be usable with, or for, only one specific vehicle. Metadata or attributes of a token may be included in, or represented by, a value of a token. For example, the VIN, the number of times a token can be used as described, operations permitted, ECUs accessible, time period and the like may all be encoded into a value of a token. In other embodiments, a token may be accompanied by, or associated with, metadata that describes attributes such as VIN, the number of times the token can be used, operations permitted, ECUs accessible, time periods etc.

For example, the value of a token included in security tokens 131 may indicate that the token can be used no more than 5 times, that the car for or with which the token can be used is identified by VIN "784 GBG", the operations that can be performed using this token are read only operations (e.g., read log or status data from ECUs) and the value the token may further indicate that only the infotainment and air conditioning systems or controls may be accessed when this token is used. In other embodiments, metadata associated with a token (e.g., using a table, list, pointer, reference or other constructs or methods as known in the art) may include the attributes, permissions, privileges, access rights and other description of the token, e.g., metadata of a token may include data such as the VIN, set of permitted operations, set of accessible units as described herein. For example, a set of tokens that enable full control of, and/or access to, all components of in-vehicle network 215 may be provided to an owner of vehicle 210 and or to a service garage but tokens that enable limited access or privileges as described may be provided to a dealer of the car. Accordingly, an embodiment may enforce security and/or control communication over an interface port based on a plurality of attributes of, included or encoded in, or associated with a token.

In some embodiments, at least a portion of a token may be randomly defined or generated. For example, a first portion of a token, code, PIN or other value as described herein may be a randomly generated unique number, a second portion may represent privileges (e.g., read, write, modify and the like), a third portion may represent attributes of a specific vehicle (e.g., a VIN), a fourth portion of the token may include the number of times the token can be used, a fifth portion may include a time period (e.g., a duration of a session) and so on. An SEU (e.g., SEU 230) may be adapted or configured to control a session (e.g., a session including communication between external device 250 and in-vehicle network 215 over interface port 240) based on attributes or metadata of or in a token. E.g., based on attributes of a token as described herein, SEU 230 may terminate a session after a time interval has elapsed, enable or permit external device 250 to communicate with some ECUs in in-vehicle network 215 and so on. Accordingly, an embodiment may be adapted to enable an external device to communicate with a selected set of components on the in-vehicle network, wherein the set is selected based on the code. As described, an embodiment may be adapted to enable an external device to perform a selected set of operations, wherein the set is selected based on the code.

In some embodiments, PINs, tokens or other security codes as described herein may be generated using a time based mechanism, system or method. A system in a vehicle (e.g., a unit such as SEU 220 or SEU 230) and a system external to the vehicle (e.g., server 260 or external device 250) may collaborate in generating PINs, tokens or other security codes. For example, a "secret" such as a secret code or value may be shared by SEU 220 and server 260 and PINs, tokens or other security codes may be generated using a hash or other code or token generation function as known in the art, e.g., a hash or other code or token generation function that takes, or receives, the secret code or value as input. Accordingly, using a shared secret as described, the same PINs, tokens or other security codes may be generated by two separate systems. For example, given or provided with the same secret code or value, SEU 220 and server 260 may generate the same or even identical set of PINs, tokens or other security codes.

Generation of PINs, tokens or other security codes may be based on a shared secret and based on a time value, e.g., a date, a time of day and/or other time based values. In some embodiments, a time of a first and second systems may be synchronized such that when the two systems generate a set of PINs, tokens or other security codes based on time, the two systems generate the same set of PINs, tokens or other security codes. Synchronizing time between two or more systems may be done using any system and/or method, e.g., using digital signature timestamp, a clock register and synchronized timestamps as described herein or using known in the art methods, e.g., the Network Time Protocol (NTP). For example, SEU 220 may synchronize a clock or time in vehicle 210 with a clock or time of server 260, and, consequently, when SEU 220 and server 260 each generates, at the same time, a set of PINs, tokens or other security codes based on time and based on a shared or common secret as described, the resulting sets may be the same or even identical.

Accordingly, an embodiment may generate a security code for controlling an access of an external device to an in-vehicle network by synchronizing a time value between a generator of a code (e.g., server 260) and a unit attached to the in-vehicle network (e.g., SEU 230), generating, by the generator and by the unit, based on a shared secret and based on the synchronized a time value, a set of codes (e.g., SEU 230 and server 260 may generate a set of codes as described). A shared secret may be provided to SEU 230 and/or to server 260 in various ways. For example, a user may provide the secret to SEU 230 and/or to server 260 or the shared secret may be provided over a network as known in the art (e.g., over a secured connection). In some embodiments, a shared secret may be provided to a security unit using an external or computing device connected to in-vehicle network 215, for example, a USB storage device or a computer may provide a shared secret to SEU 220 or to SEU 230.

Any method or system may be used in order to provide or share a shared secret as described, e.g., a shared secret may be printed on a paper delivered to a car owner or it may be set or defined by the car owner, a shared secret may be transferred to the car from the internet or other cloud platform via the telematics or any other remote connection, a shared secret may be transferred to a vehicle from a local computer connected to the vehicle or other trusted data source or a shared secret may be stored in a hardware, secured component connected to an in-vehicle network.

A security code (e.g., generated based on time and based on a shared secret as described) may be provided to a user and/or to an external device. For example, a user may be provided (e.g., by server 260) with a set of codes generated as described and may use the codes in order to enable external device 250 to access in-vehicle network 215, e.g., using an interface of external device 250 the user may enter the codes to external device 250 and external device 250 may subsequently use the codes as described, e.g., provide codes to SEU 230 that may enable external device 250 to access in-vehicle network 215 based on receiving codes from external device 250. Accordingly, an embodiment may generate a set of same or identical tokens based on a synchronized time value between a generator and a security unit in an in-vehicle network such that at least one token is present, included in, or available to, the security unit and another similar or identical token is provided to an external device.

An embodiment may select whether to enable or disable the external device to transfer data over an interface port of the in-vehicle network based on a token or code received from the external device. For example, two similar or identical tokens may be generated by server 260 and by SEU 230 as described, the token generated by server 260 may be provided to external device 250 (e.g., by server 260 or be a user who receives the token from server 260), when external device 250 provides the token to SEU 230, SEU 230 may determine that the token is legitimate or usable by finding a similar or identical token, e.g., in tokens 133 and may therefore allow external device 250 to communicate over interface port 240. If a token provided by external device 250 cannot be verified (e.g., the token does not match a token stored or included in tokens 133) then SEU 230 may prevent external device 250 from communicating over interface port 240. As described, based on a token, SEU 230 may allow external device only some operations or communications, e.g., communicate with a sub-set of units on in-vehicle network 215, communicate over interface port 240 for a limited time period and so on.

In some embodiments, a security unit (e.g., SEU 230) may validate a data stream originating, or coming from, or destined to, at an external device, based on a set of rules. For example, SEU 230 may analyze or examine a flow of data to/from external device 250 using a set of rules or criteria defined or included in configuration data 133. For example, configuration data 133 may include rules, criteria for, or characteristics, attributes, definitions or other aspects of, valid, authorized or permitted flows and/or rules for, or characteristics, attributes, definitions or other aspects or descriptions of, flows or transactions of data that should be prevented or blocked. For example, rules characteristics, attributes, definitions or other aspects or descriptions of data flows may include, or be related to a specific component on the in-vehicle network, a length of a network message, a hash value included in a message, an order by which components on the in-vehicle network are accessed and the like. For example, based on a rule, SEU 230 may determine that a flow that include messages longer than 512 bytes sent to an engine control unit is suspicious and should be blocked (e.g., since configuration data 133 indicates that the engine control unit does not support messages that include more than 512 bytes). In another exemplary case, a value larger than a threshold specified in configuration data 133, included in a message sent to a gearbox control unit may cause SEU 230 to identify a flow that should be prevented or blocked.

Any flow of data to/from any unit connected to in-vehicle network 215 may be characterized by, for example, messages length and content, number and types of messages, order of specific messages in the flow of messages, content of messages and so on, accordingly, any flow of messages between external device 250 and any unit connected to in-vehicle network 215 may be checked or validated using a characterization of the flow as included in configuration data 133. Accordingly, SEU 230 may validate data flows as described, identify suspicious flows and block, prevent or interrupt suspicious or undesirable flows as described. Rules, criteria for analyzing and monitoring data flows and/or characteristics, attributes, definitions or other aspects or descriptions of data flows may be provided from any source, e.g., they may be generated based on recording data streams or flows during an authenticated session or during normal operation of a system over time or rules for, and descriptions of data flows or streams may be provided by a remote server (e.g., server 260), by a dongle connected to interface port 240 as described, by a manufacturer of vehicle 210 and/or any applicable source.

In some embodiments, a security unit (e.g., SEU 230) may be adapted to record information related to a communication with an external device. For example, any information related to a session or a communication of data from/to external device 250 may be recorded by SEU 230, e.g., in storage 130 and as shown by recorded data 132. For example, recoded data 132 may include some or even all of the data received from external device 250 and/or some or even all of the data sent to external device 250 from in-vehicle network 215. Recorded data may include metadata, e.g., the time a communication session with external device 250 was established, the components external device 250 communicated with, tokens received from external device 250 and the like.

A security unit (e.g., SEU 220 and/or SEU 230) may upload recorded information to a server, e.g., SEU 230 may use a telematics system included in vehicle 210 in order to upload data in recorded data 132 to server 260. An SEU or server 260 may use recorded data in order to generate a history log of maintenance service of the vehicle, identify unauthorized access to the in-vehicle network and/or generate other insights based on the recorded data. For example, based on recorded data 132 that may, as described, include description of any aspect of communication with external devices, information that indicates where, when and how vehicle 210 was treated or serviced (e.g., was a service done by an official or authorized dealership). Uploading recorded data 132 to a server or providing recorded data 132 to an external computer may be done using any system and method. For example, a diagnostic tester or system (e.g., connected via interface port 240) may read recorded data 132 and recorded data may then be transferred to any computer or system, e.g., to server 260. Recorded or logged data 132 may be used to create a treatment logbook" of all dealership access to the in-vehicle network, for example, based on recorded data 132 a service or treatment history may be produced. For example, a buyer may validate a service history of a vehicle based on recorded data 132 and thus not solely rely on information from a seller of the vehicle. In another case or aspect, a manufacturer or insurer of a vehicle may validate a service history of a vehicle based on recorded data 132, e.g., determine whether or not a vehicle was serviced or treated by an unofficial or uncertified garage. Presence or activity of malicious entities may be identified based on recorded data 132, e.g., attempts to communicate certain information to an external device (e.g., made by a malicious entity in in-vehicle network 215) and/or attempts to gain control of components in in-vehicle network 215 (e.g., made by a compromised diagnostics system connected as external device 250) may all be identified by analysis of recorded data 132.

Information in recorded data 132 may be encrypted. For example, either before storing data in recorded data 132 or before uploading data from recorded data 132 to server 260, SEU 220 may encrypt the data. Recorded data 132 may be digitally signed by SEU 230 such that server 260 may verify that data received from SEU 230 is indeed authentic, e.g., based on a digital signature server 260 may verify that data received from SEU 230 was not modified by an entity other than SEU 230.

In some embodiments, a security unit may be an external unit that may be fitted on an interface port. For example, SEU 230 may be connected to an existing interface port, e.g., SEU 230 may be sold or provided separately from vehicle 210 (e.g., as an aftermarket product) and may be installed on interface port 240 as a pass through device such that SEU 230 prevents dealership personnel from directly connecting to interface port 240. For example, in some embodiments, after SEU 230 is connected to interface port 240, any communication with interface port 240 must go through SEU 230, accordingly SEU 230, when connected to interface port 240 may enforce security measures as described herein and a vehicle equipped with an SEU 230 as described may be fully protected from intrusion through an interface port such as interface port 250. In some embodiments, an SEU provided as an aftermarket product as described may be a software module, e.g., as shown and described herein with reference to SEU 220. For example, software that provides SEU functionality may be downloaded into and ECU or gateway connected to in-vehicle network 215 thus an SEU may be added to a vehicle at any point in time, e.g., any time after the vehicle is manufactured. Of course, a hardware SEU such as SEU 230 or a software SEU such as SEU 220 may be installed or provided by a manufacturer of a vehicle.

In some embodiments, a system may include an external security unit connected to an interface port and the system (e.g., the external security unit or a unit connected to the in-vehicle network) may be configured to generate an alarm signal when or if the external security unit is disconnected or removed from the interface port.

For example, SEU 230 may include a power source 121 as described and a communication component, e.g., a Global System for Mobile communication (GSM) unit, a time division multiple access (TDMA) unit or a Code Division Multiple Access (CDMA) unit and, upon detecting that it was disconnected from interface port 240 (e.g., by identifying a disconnection of a power source, a disconnection of a data source or by way of a micro-switch as known in the art), SEU 230 may send a message alerting a user, e.g., SEU 230 may send an SMS or email message. Any other form of alert or notification may be generated by SEU 230 when it is disconnected from interface port 240, e.g., an audible alert may be sounded using a speaker installed in SEU 230 or SEU 230 may communicate with a unit in in-vehicle network 215 (e.g., via a telematics component as described) and present a warning or other message on a display in vehicle 210, activate an alarm system of vehicle 210 and so on.

In some embodiments, an external security unit or system may select whether or not to generate an alarm signal when it is removed from an interface port as described based on a code that may be provided, to the external security system or unit, from a number of sources, e.g., based on a code provided from an in-vehicle network (e.g., from a unit included in vehicle 210), based on a code provided from an external unit or based on a code provided from, or over, a communication network. For example, e.g., in order to replace SEU 230 or otherwise treat vehicle 210, prior to removing or disconnecting SEU 230 from interface port 240, a technician may provide SEU 230 with an alarm disabling code, e.g., the code may be entered, by the technician, into external device 250 and may be provided therefrom to SEU 230. SEU 230 may validate the code (e.g., as described herein with respect to security codes 131 or based on data in configuration data 133) and if the code is validated, SEU 230 may not generate an alarm as described when it is removed from interface port 240.

In some embodiments, SEU 230 (or another external security unit) may be adapted to determine a disconnection from an interface port by identifying at least one of: a disconnection of the external unit from a power source, a loss of communication with a component on the in-vehicle network and a mechanical component adapted to generate a signal when the external unit is removed from the interface port. For example, SEU 230 may include a micro-switch or other mechanical component that may sense a disconnection of SEU 230 from interface port 240. In some embodiments, SEU 230 may continuously, repeatedly or periodically exchange a beacon message with a unit connected to in-vehicle network 215, e.g., with SEU 220, and, upon failing to receive a response to a beacon message from SEU 220, over a predefined time (or for a predefined number of consecutive beacon messages), SEU 230 may determine that it was disconnected from interface port 240. In other embodiments, a power supply (e.g., for charging power source 121 or for operating controller 105) from vehicle 210 to SEU 230 may be monitored by SEU 230 and, if the power supply is interrupted, SEU 230 may determine that it was disconnected or removed from interface port 240.

In some embodiments, an in-vehicle network may include a component adapted to control operation of the vehicle based on at least one of: a presence or absence of an external security unit on the in-vehicle network and/or a signal received from the external unit after the external unit was removed from the interface port. For example, using a beacon message as described herein, SEU 220 may determine whether or not SEU 230 is present at interface port 240. If SEU 220 determines or identifies that SEU 230 is not present (e.g., not connected to interface port 240) then SEU 220 may perform any action, including disabling any usage of vehicle 210, e.g., by controlling an engine control unit or a gear control unit as described, SEU 220 may prevent using vehicle 210. Upon identifying that SEU 230 was removed from interface port 240, SEU 220 may generate an alarm as described.

Figure 4:
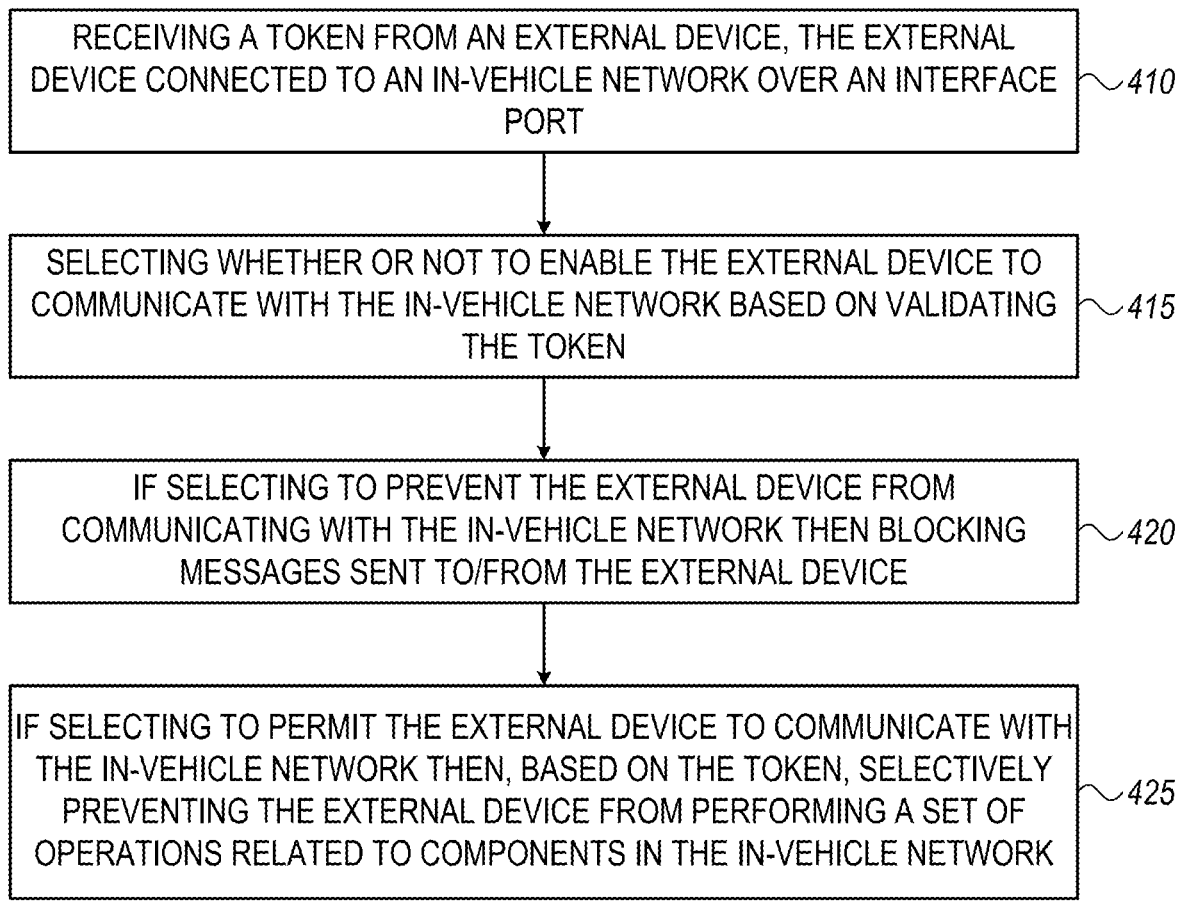
FIG. 4 shows a flowchart of a method according to illustrative embodiments of the present invention.

Reference is made to FIG. 4 which shows a flowchart of a method according to illustrative embodiments of the present invention. As shown by block 410, a token may be received from an external device connected to an in-vehicle network over an interface port. For example, a token 300 may be received, by SEU 230 or by SEU 220, from external device 250 connected to in-vehicle network 215 over interface port 240.

As shown by block 415, based on validating the token, it may be selected whether or not to enable the external device to communicate with the in-vehicle network. For example, SEU 230 may examine a token received from external device 250, validate the token as described herein (e.g., by comparing the token to tokens stored in storage 130 as described) and, the token is validated, SEU 230 may permit or enable external device 250 to communicate with in-vehicle network 215, e.g., exchange messages with nodes attached to in-vehicle network 215. Selecting, e.g., by an SEU, whether or not to permit an external device to communicate with components connected to an in-vehicle network may be based on a value in a security code or token received by the SEU.

For example, based on a value in a security code or token (e.g. as described with reference to FIG. 3), an SEU may select whether or not to permit a system external to a vehicle (e.g., external device 250 that may be external to vehicle 210) to communicate with one or components more ECUs connected to in-vehicle network 215. If an SEU (e.g., SEU 230) selects to permit external device 250 to communicate with components on in-vehicle network 215 then SEU 230 may forward messages received from/to external device 250 to/from in-vehicle network 215, and, if an SEU (e.g., SEU 230) selects to prevent external device 250 from communicating with components on in-vehicle network 215 then SEU 230 may block message to/from external device 250 as described. ECUs described herein, e.g., engine control 62, suspension control 63, traction control 64, gearbox control 65, and braking control (anti-skid braking) control 66 may be considered and/or referred to herein as, in-vehicle components. For example, a component such as traction control 64 that may be included in vehicle 210 may be considered as an in-vehicle component. If an SEU selects to enable, allow or permit a system external to a vehicle to communicate with an in-vehicle network (or with in-vehicle components) then the SEU may, for example, forward message to/from the external system from/to in-vehicle components, if the SEU selects to prevent or forbid a system external to a vehicle to communicate with an in-vehicle network (or with in-vehicle components) then the SEU may block messages communicated, e.g., from the external system to an in-vehicle component or the SEU may prevent establishment of sessions between the external system and ECUs as described.

As shown by block 420, messages sent to/from an external device may be blocked if it was selected to prevent the external device from communicating with the in-vehicle network. For example, if SEU 230 determines a token received from external device 250 is invalid, e.g., is, or cannot be, validated, or if external device 250 does not provide a valid token, SEU 230 may block messages sent from or to external device 250. For example, unless a valid token is received from external device 250, SEU 230 or SEU 220 may prevent external device 250 from establishing a session with a node on in-vehicle network 215, e.g., by blocking messages as described.

As shown by block 425, if an embodiment selects to permit an external device to communicate with an in-vehicle network then, based on a token, an embodiment may selectively prevent the external device from performing a set of operations related to components in the in-vehicle network. For example, although SEU 230 may select to permit external device 250 to communicate with in-vehicle network 215 (e.g., based on validating a token as described), SEU 230 may still control the communication, for example, based on values in token 300, SEU 230 may permit or enable external device 250 to communicate with an infotainment control unit in vehicle 210 but prevent (e.g., by blocking messages as described) external device 250 from communicating with an engine control unit of vehicle 210.

In the description and claims of the present application, each of the verbs, "comprise" "include" and "have", and conjugates thereof, are used to indicate that the object or objects of the verb are not necessarily a complete listing of components, elements or parts of the subject or subjects of the verb. Unless otherwise stated, adjectives such as "substantially" and "about" modifying a condition or relationship characteristic of a feature or features of an embodiment of the disclosure, are understood to mean that the condition or characteristic is defined to within tolerances that are acceptable the embodiment as described. In addition, the word "or" is considered to be the inclusive "or" rather than the exclusive or, and indicates at least one of, or any combination of items it conjoins.

Descriptions of embodiments of the invention in the present application are provided by way of example and are not intended to limit the scope of the invention. The described embodiments include different features, not all of which are required in all embodiments. Some embodiments utilize only some of the features or possible combinations of the features. Variations of embodiments of the invention that are described, and embodiments including different combinations of features noted in the described embodiments, will occur to a person having ordinary skill in the art. The scope of the invention is limited only by the claims.

Unless explicitly stated, the method embodiments described herein are not constrained to a particular order in time or chronological sequence. Additionally, some of the described method elements may be skipped, or they may be repeated, during a sequence of operations of a method.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

The invention claimed is:

1. A system comprising:
   an in-vehicle communication network included in a vehicle and electrically connected to a physical interface port for connecting an external device to the in-vehicle communication network, wherein the external device is adapted to physically connect to the physical interface port and to exchange data with the in-vehicle communication network, via the physical interface port; and
   a security unit including a memory and a controller physically installed between the physical interface and the in-vehicle communication network and adapted, based on a security code received from the external device, to:
      select at least one of: a set of components connected to the in-vehicle communication network, and a set of segments of the in-vehicle communication network; and
      prevent the external device from communicating with at least one of: the selected set of components and the selected set of segments,
   wherein the security code is generated based on an interaction with a user; and
   wherein the security unit is adapted to validate the security code based on a unique attribute of the vehicle.

2. The system of claim 1, comprising a server, wherein the server is adapted to:
   receive information recorded by the security unit; and
   perform at least one of:
      generate a history log of maintenance service of the vehicle,
      identify unauthorized access to the in-vehicle network,
      identify malicious activity on the in-vehicle network, and
      generate insights based on the recorded data.

3. The system of claim 1, wherein the security unit is adapted to:
   share a secret with a generator of the security code; and
   validate the security code based on the shared secret.

4. The system of claim 1, wherein the security unit is adapted to use the same security code a predefined number of times.

5. The system of claim 1, wherein the security unit is adapted to prevent communication over the interface port based on at least one of: a predefined time interval and an event.

6. The system of claim 1, wherein the security code is provided to the security unit by one of: a hardware component directly connected to the interface port and an external network.

7. The system of claim 1 wherein the security code is a vehicle-specific code generated or provided by one of: a user associated with the vehicle and a server.

8. The system of claim 1 wherein the security code includes at least two of:
   a unique identification of the security code, an identification of the vehicle, a duration value, a reuse value, an identification of an event, an identification of nodes connected to the in-vehicle network, an indication of an operation, a context, and vehicle-specific identification.

9. The system of claim 1, wherein the security unit is adapted to prevent communication over the interface port based on a context of the vehicle.

10. The system of claim 1 wherein the security code is a vehicle-specific code generated based on an attribute of the vehicle, and wherein the vehicle-specific code is validated, by the security unit, based on the attribute of the vehicle.

11. The system of claim 1, wherein the security unit is adapted to record information related to a communication with the external device.

12. A method comprising:
    receiving, by a security unit including a memory and a controller, from an external device, a code including digital information, wherein the security unit is physically installed between the physical interface and an in-vehicle communication network included in a vehicle, and wherein the external device is adapted to exchange data with the in-vehicle communication network, via a physical interface port;
    selecting, by the security unit and based the digital information, at least one of: a set of components connected to the in-vehicle communication network, and a set of segments of the in-vehicle communication network; and
    preventing the external device from communicating with at least one of: the selected set of components and the selected set of segments,
    wherein the security code is generated based on an interaction with a user; and
    wherein validating the security code, by the security unit, based on a unique attribute of the vehicle.

13. The method of claim 12, comprising recording information related to a communication with the external device.

14. The method of claim 12, comprising:
    receiving, by a server, information recorded by the security unit; and
    performing, by the server, at least one of:
        generating a history log of maintenance service of the vehicle,
        identifying unauthorized access to the in-vehicle network,
        identifying malicious activity on the in-vehicle network, and
        generating insights based on the recorded data.

15. The method of claim 12, comprising reusing the same security code according to one of:
    a predefined number of time, a predefined time interval and an event.

16. The method of claim 12, comprising preventing communication over the interface port based on a context of the vehicle.

17. The method of claim 12, comprising validating the security code based on cryptographic material associated with the security code.

18. The method of claim 12, wherein the security code includes at least two of:
    a unique identification of the security code, an identification of the vehicle, a duration value, a reuse value, an identification of an event, an identification of nodes connected to the in-vehicle network, an indication of an operation, a context, and vehicle-specific identification.

* * * * *